United States Patent
Guo et al.

(10) Patent No.: US 12,466,797 B2
(45) Date of Patent: Nov. 11, 2025

(54) COMPOUND HAVING ANTI-AGING AND DISCOLORATION RESISTANCE EFFECTS AND PREPARATION METHOD THEREFOR

(71) Applicant: Sennics Co., Ltd., Shanghai (CN)

(72) Inventors: Xiangyun Guo, Shanghai (CN); Jinguo Xing, Shanghai (CN); Yanxiang Liu, Shanghai (CN); Hui Li, Shanghai (CN); Yang Gao, Shanghai (CN); Zhimin Tang, Shanghai (CN); Haibo Zhu, Shanghai (CN); Qi Qi, Shanghai (CN)

(73) Assignee: Sennics Co., Ltd., Shanghai (CN)

( * ) Notice: Subject to any disclaimer, the term of this patent is extended or adjusted under 35 U.S.C. 154(b) by 781 days.

(21) Appl. No.: 17/736,074

(22) Filed: May 3, 2022

(65) Prior Publication Data
US 2022/0306590 A1    Sep. 29, 2022

Related U.S. Application Data

(63) Continuation of application No. PCT/CN2020/125100, filed on Oct. 30, 2020.

(30) Foreign Application Priority Data

Nov. 4, 2019 (CN) .......................... 201911066120.0

(51) Int. Cl.
  *C07D 251/70* (2006.01)
  *B60C 1/00* (2006.01)
  *C08K 5/3492* (2006.01)

(52) U.S. Cl.
  CPC .............. *C07D 251/70* (2013.01); *B60C 1/00* (2013.01); *C08K 5/34922* (2013.01)

(58) Field of Classification Search
  CPC .... C07D 251/70; B60C 1/00; C08K 5/34922; C08K 5/5313; C08K 5/3492; C08L 7/00; C08L 9/00; C08L 21/00
  See application file for complete search history.

(56) References Cited

U.S. PATENT DOCUMENTS

| | | | |
|---|---|---|---|
| 3,530,127 A * | 9/1970 | Eschle ................. | C08K 5/3492 544/219 |
| 3,828,002 A * | 8/1974 | Westlinning ......... | C08K 5/3492 544/212 |
| 4,794,134 A | 12/1988 | Wheeler et al. | |
| 4,794,135 A | 12/1988 | Wheeler et al. | |
| 4,972,010 A | 11/1990 | Wheeler et al. | |
| 5,118,807 A | 6/1992 | Wheeler | |
| 5,120,844 A * | 6/1992 | Wheeler .............. | C07D 251/46 544/212 |
| 6,193,960 B1 | 2/2001 | Metzger et al. | |
| 7,375,222 B2 | 5/2008 | Kubota et al. | |
| 7,572,850 B2 | 8/2009 | Hetzel et al. | |
| 2006/0194803 A1 | 8/2006 | Kubota et al. | |
| 2012/0248378 A1 | 10/2012 | Stieber et al. | |
| 2016/0251502 A1 | 9/2016 | Cotugno et al. | |
| 2017/0306128 A1 | 10/2017 | Caliano et al. | |
| 2018/0237376 A1 | 8/2018 | Guo et al. | |
| 2019/0284370 A1 | 9/2019 | Whitney et al. | |
| 2019/0375913 A1 | 12/2019 | Gao et al. | |
| 2020/0392069 A1 | 12/2020 | Gao et al. | |

FOREIGN PATENT DOCUMENTS

| | | |
|---|---|---|
| CA | 1340206 C | 12/1998 |
| CN | 106032408 A | 10/2016 |
| CN | 107955207 A | 4/2018 |
| CN | 108203414 A | 6/2018 |
| JP | S6381145 A | 4/1988 |
| JP | 3946839 B2 | 7/2007 |
| JP | 2013023675 A | 2/2013 |

(Continued)

OTHER PUBLICATIONS

Office Action Dated Nov. 18, 2024 From Colombian Patent Office for the Corresponding Foreign Counterpart Application No. NC2022/0006895 Filed in Colombia and English Translation Thereof.

Nakamura, Yoshiro et al., "Studies on polyfunctional additives (VI). Novel antioxidant selected for peroxide crosslinking system of rubbers—2,4,6-tri(antioxidant group)-1,3,5-triazine," Journal of the Japanese Rubber Association, vol. 57, No. 10, pp. 610-615 (Dec. 1984).

Office Action and partial English translation thereof issued on Mar. 25, 2024 by Korean IP Office for Korean Patent Application No. 10-2022-7018541, total 10 pages.

*Primary Examiner* — Robert S Jones, Jr.
*Assistant Examiner* — Joshua Caleb Bledsoe
(74) *Attorney, Agent, or Firm* — Mei & Mark LLP; Manni Li

(57) ABSTRACT

A compound having anti-aging and discoloration resistance effects and a preparation method therefor are provided. The structure of the compound is represented by formula (I). The compound provides longer-lasting anti-aging performance, and has discoloration resistance. The compound may be used as an anti-aging agent in rubber products, especially rubber tires, and can prevent the aging and deterioration of rubber products or rubber tires due to light, heat, oxygen, and fatigue, during use.

(I)

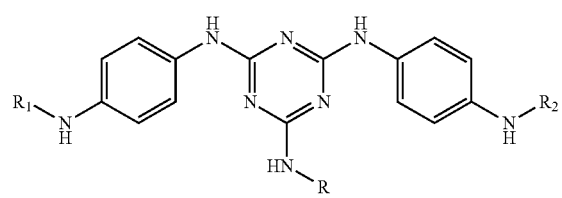

21 Claims, No Drawings

(56) References Cited

FOREIGN PATENT DOCUMENTS

| WO | WO 2015/077635 A2 | 5/2015 |
| WO | 2017164293 A1 | 9/2017 |

\* cited by examiner

COMPOUND HAVING ANTI-AGING AND DISCOLORATION RESISTANCE EFFECTS AND PREPARATION METHOD THEREFOR

CROSS-REFERENCE TO RELATED APPLICATIONS

The subject application is a continuation of PCT/CN2020/125100 filed on Oct. 30, 2020, which claims priority on Chinese Application No. 201911066120.0 filed on Nov. 4, 2019 in China. The contents and subject matter of the PCT international application and Chinese priority application are incorporated herein by reference.

TECHNICAL FIELD

The present invention relates to rubber additive, particularly, compound with anti-aging and discoloration resistance effects and its preparation method.

BACKGROUND ART

At present, rubber articles, especially tire articles, usually use p-phenylenediamine compounds as anti-degradants. Widely used compounds are p-phenylenediamine derivatives such as dialkyl-p-phenylenediamines, alkylaryl-p-phenylenediamines, and diaryl-p-phenylenediamines, including N-(1,3-dimethylbutyl)-N'-phenyl-p-phenylenediamine (referred to as 6PPD or 4020), N-isopropyl-N'-phenyl-p-phenylenediamine (referred to as IPPD), N,N'-bis-(1,4-dimethylamyl)-p-phenylenediamine (referred to as 77PD), and diphenyl p-phenylenediamine mixture (referred to as anti-degradant 3100 or DTPD).

Although the existing anti-degradant products provide relatively significant anti-aging protection on tires and other products, these anti-degradants in rubber articles or tires quickly migrate to the surface of rubber articles or tires due to their own discoloration during use, which leads to pollution, discoloration, and damage on the surface of rubber articles or tires; at the same time, as the anti-degradants migrate to the surface of rubber products such as tires too fast, resulting in rapid reduction of anti-degradants in the product, the protection they provide during a long period of time is relatively poor.

In recent years, with increased demand for green and sustainable economic development, users are paying increased attention to issues such as aging-resistance and surface discoloration of tires. Therefore, there is an urgent need to develop an anti-degradant product with longer-lasting anti-aging property than existing anti-degradants and the discoloration resistance.

SUMMARY OF INVENTION

To solve the problems in the current technology, the present invention provides compounds with anti-aging and discoloration resistance functions and preparation method thereof. The compound of the present invention has long-lasting aging resistance and discoloration resistance, can be used as an anti-degradant in rubber articles, especially rubber tires, and can prevent the aging and deterioration of rubber articles or rubber tires due to light, heat, oxygen, fatigue, etc., during use.

Specifically, the present invention provides a compound represented by the following formula (I):

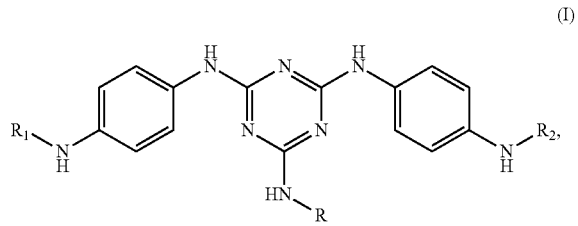

wherein R is C3~C16 alkyl, C3~C16 alkyl substituted by C3~C10 cycloalkyl, C3~C10 cycloalkyl, or C3~C10 cycloalkyl substituted by C3~C16 alkyl;

$R_1$ and $R_2$ are identical or different, each being independently selected from C3~C10 alkyl, C3~C10 cycloalkyl or C6~C14 aryl substituted C3~C10 alkyl, C3~C10 cycloalkyl, C3~C10 alkyl substituted C3~C10 cycloalkyl, C6~C14 aryl, and C3~C10 alkyl substituted C6~C14 aryl.

In the present invention, R may be C3~C10 alkyl or C3~C10 cycloalkyl, preferably C3~C10 branched chain alkyl or C3~C10 cycloalkyl, and more preferably isopropyl, tert-butyl group, tert-octyl, or cyclohexyl.

In the present invention, $R_1$ and $R_2$ may be identical or different, each independently being C3~C10 alkyl or phenyl, preferably each independently being C3~C10 branched chain alkyl or phenyl, and more preferably each independently being isopropyl, 1,4-dimethylpentyl, or phenyl.

In the present invention, the compound is selected from:

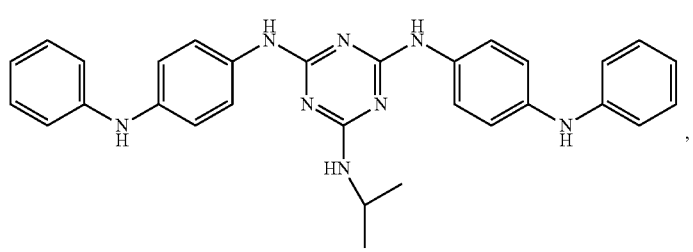

(I-1)

-continued
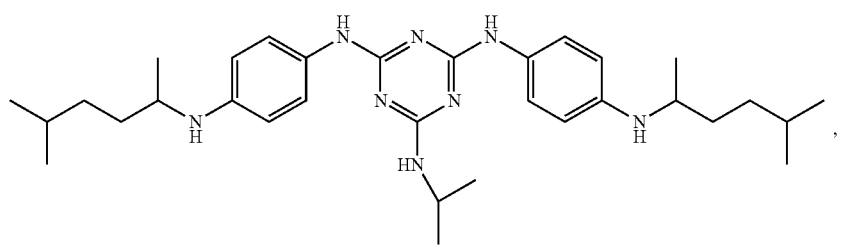
(I-2)
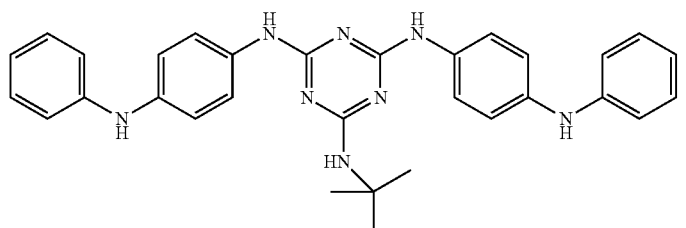
(I-3)
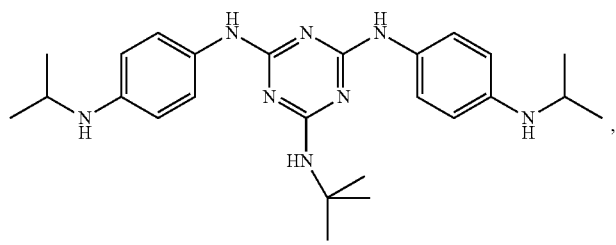
(I-4)
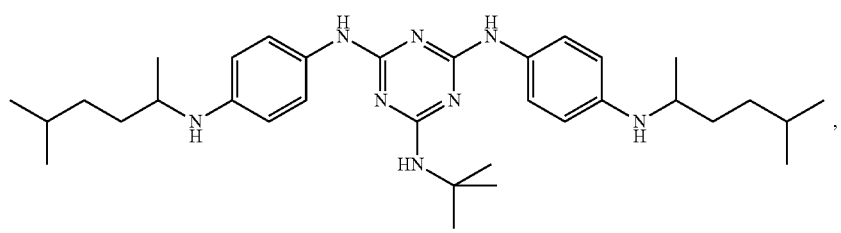
(I-5)
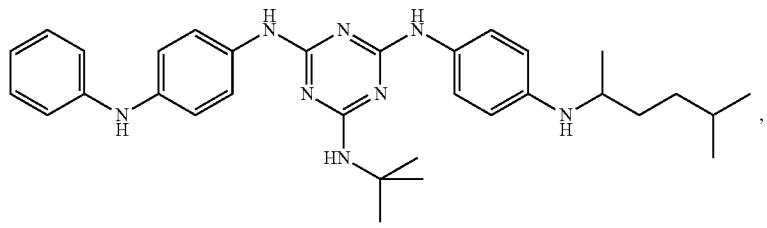
(I-6)
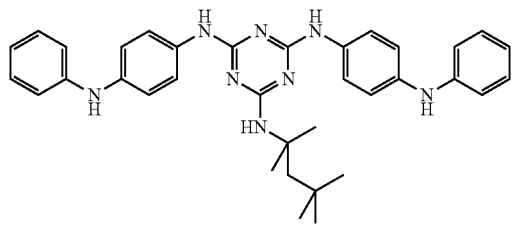
(I-7)
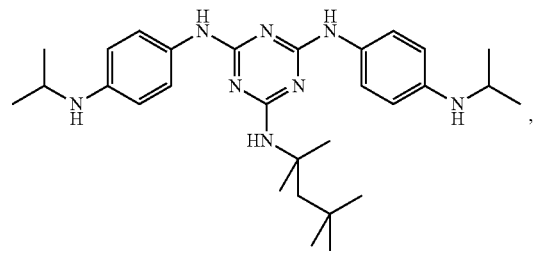
(I-8)

-continued
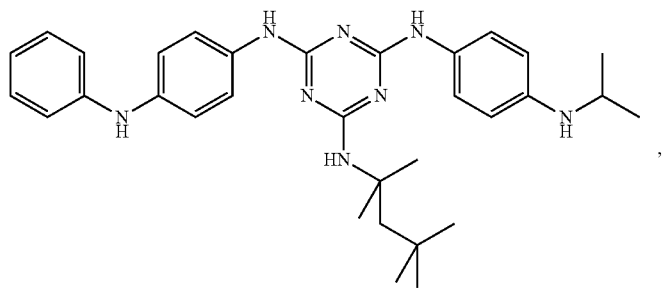
(I-9)
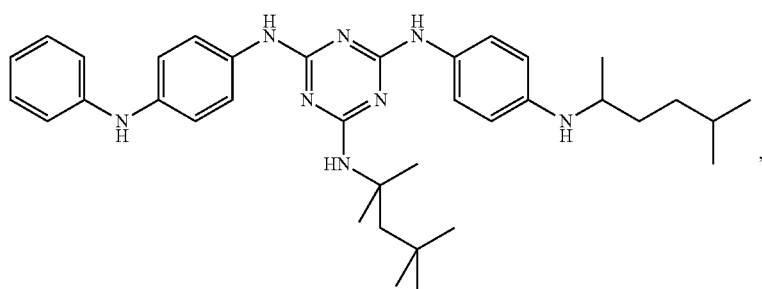
(I-10)
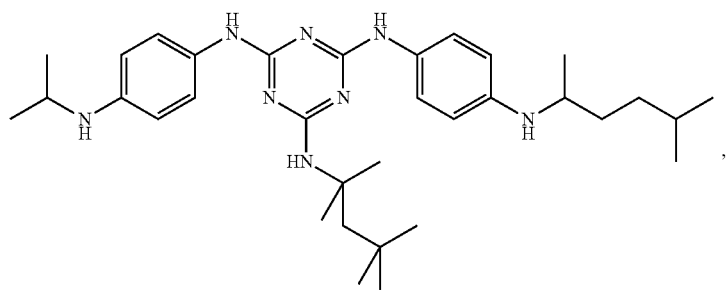
(I-11)
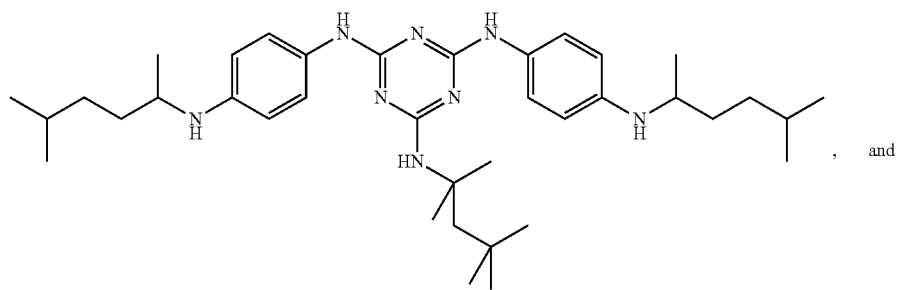
(I-12)
, and
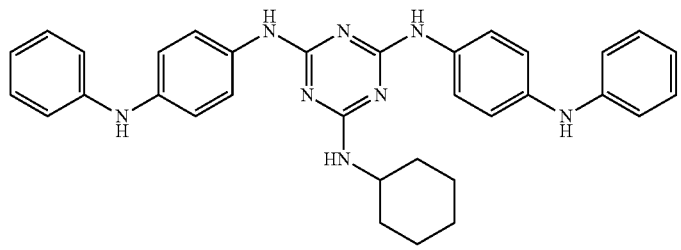
(I-13)
.

The present invention also provides a method for preparing the compound of the present invention, comprising:

(1) reacting cyanuric chloride and NH₂R to obtain an intermediate A represented by the following formula:

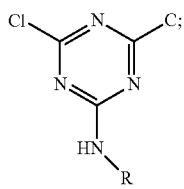

(A)

(2) reacting the intermediate A and N—R₁-p-phenylenediamine to obtain an intermediate B represented by the following formula:

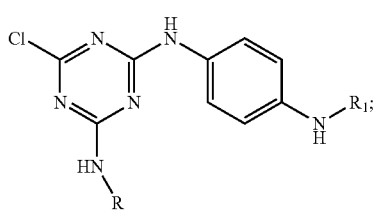

(B)

(3) reacting the intermediate B and N—R₂-p-phenylenediamine to obtain the compound of formula (I):

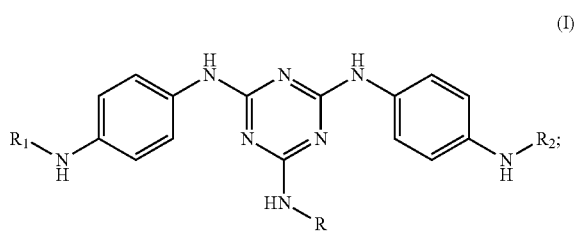

(I)

wherein, R, R₁ and R₂ in the compounds of formula A, formula B and formula (I) are as defined in the present invention.

In step (1) of the method of the present invention, an alkaline solid powder may be added to the reaction, and the reaction temperature may be in a range of 0 to 35° C.

In step (2) of the method of the present invention, an alkaline liquid may be added, and the reaction temperature may be in a range of 50° C. to 100° C.

In step (3) of the method of the present invention, the reaction temperature may be in a range of 80° C. to 180° C.

In the present invention, R₁ and R₂ may be identical, and steps (2) and (3) may be combined into one step (2'), that is, reacting the intermediate A and N—R₁-p-phenylenediamine to obtain the compound of formula (I).

In step (2') of the method of the present invention, an alkali solution is added, and the reaction is first carried out at 50° C. to 100° C., and then carried out at 80° C. to 180° C.

The present invention also provides a rubber composition comprising the compound of the present invention.

The present invention further provides a rubber article prepared by using the rubber composition of the present invention as a rubber component, and preferably, the rubber product is a tire.

The present invention furthermore provides a method of use of the compound of the present invention in improving anti-aging properties and/or discoloration resistance of a rubber or a rubber product, and preferably, the rubber product is a tire.

DETAILED DESCRIPTION

The present invention is further explained in detail in connection with the examples. One of ordinary skill in the art may make modifications and changes based on the description without departing from the scope of the present invention.

In the present invention, all features such as numerical value, quantity, content and concentration defined in the form of numerical range or percentage range are only for brevity and convenience. Accordingly, the description of the numerical range or percentage range shall be deemed to have covered and specifically disclosed all possible sub-ranges and individual values (including integers and fractions) within the range.

Herein, an alkyl refers to a straight-chain or branched monovalent saturated hydrocarbon group, usually containing 1 to 16 carbon atoms (C1~C16 alkyl), and preferably containing 3 to 16 carbon atoms (C3~C16 alkyl). Examples of alkyl groups include, but are not limited to, methyl, ethyl, n-propyl, isopropyl, n-butyl, isobutyl, tert-butyl, 1,4-dimethylpentyl, and tert-octyl. Herein, the alkyl group can be optionally substituted by aryl or cycloalkyl, and usually the number of substituents is one. Examples of substituted alkyl groups include, but are not limited to, cyclohexylmethyl, benzyl, and phenethyl.

Herein, an alkylene refers to a straight-chain or branched divalent saturated hydrocarbon group, usually containing 1 to 16 carbon atoms (C1~C16 alkylene), and preferably containing 3 to 16 carbon atoms (C3~C16 alkylene). Examples of alkylene groups include, but are not limited to, methylene, ethylene, and 1,3-propylene.

Herein, a cycloalkyl refers to a monovalent saturated hydrocarbon ring containing 3 to 10 carbon atoms, and preferably containing 3 to 8 carbon atoms. Examples of cycloalkyl groups include, but are not limited to, cyclopropyl, cyclobutyl, cyclopentyl, cyclohexyl, cycloheptyl, cyclooctyl, and adamantyl. Herein, cycloalkyl may be optionally substituted with alkyl. The number of substituents may be one or two. An example of a substituted cycloalkyl includes, but is not limited to, methylcyclohexyl.

Herein, a cycloalkylene refers to a divalent saturated hydrocarbon ring containing 3 to 10 carbon atoms, and preferably 3 to 8 carbon atoms. Examples of cycloalkylene include, but are not limited to, 1,2-cyclopentanediyl and 1,2-cyclohexanediyl.

Herein, an aryl group refers to a monovalent group left after removing one hydrogen atom from an aromatic nucleus carbon of an aromatic hydrocarbon molecule. The number of ring carbon atoms of the aryl group is usually 6 to 14. Exemplary aryl groups include phenyl and naphthyl. Aryl groups may be optionally substituted with alkyl, cycloalkyl, and/or aryl groups. The number of substituents is usually one or two. Examples of substituted aryl groups include, but are not limited to, 2-methylphenyl, 4-cyclohexylphenyl, 4-(2-methylcyclohexyl)phenyl, and 4-biphenyl.

The compound of the present invention having the structure shown in formula (I) provides better weather resistance, durability, and discoloration resistance than conventional anti-degradants, and its specific structure is as follows:

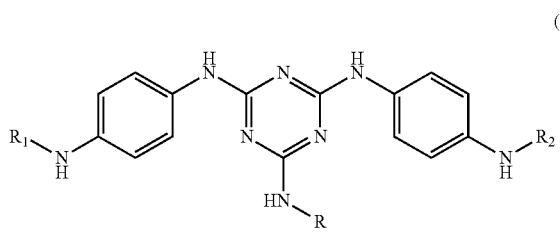

(I)

wherein, R is C3~C16 alkyl, C3~C10 cycloalkyl substituted C3~C16 alkyl, C3~C10 cycloalkyl, or C3~C10 cycloalkyl substituted by C3~C16 alkyl;

$R_1$ and $R_2$ are identical or different, each being independently selected from C3~C10 alkyl, C3~C10 alkyl substituted by C6~C14 aryl or C3~C10 cycloalkyl, C3~C10 cycloalkyl, C3~C10 cycloalkyl substituted by C3~C10 alkyl, C6~C14 aryl, and C6~C14 aryl substituted by C3~C10 alkyl.

Preferably, R is C3~C10 alkyl or C3~C10 cycloalkyl. In certain embodiments of the present invention, R is a C3~C10 alkyl group, preferably a C3~C10 branched chain alkyl group or a C3~C10 cycloalkyl group, such as isopropyl, tert-butyl, tert-octyl, or cyclohexyl.

Preferably, $R_1$ and $R_2$ are each independently C3~C10 alkyl or phenyl. In one preferred embodiment, $R_1$ and $R_2$ are each independently C3~C10 branched chain alkyl or phenyl. In some embodiments, $R_1$ and $R_2$ are each independently isopropyl, 1,4-dimethylpentyl, or phenyl.

In some embodiments of the present invention, R is tert-butyl or tert-octyl, and $R_1$ and $R_2$ are each independently 1,4-dimethylpentyl or phenyl.

The compound of the structure represented by the formula (I) of the present invention can be prepared in the following three steps:

In the first step, an intermediate A is prepared by using cyanuric chloride (TCT) and $NH_2R$ as reaction raw materials, wherein R is C3~C16 alkyl, C3~C16 alkyl substituted by C3~C10 cycloalkyl, C3~C10 cycloalkyl or C3~C10 cycloalkyl substituted by C3~C16 alkyl;

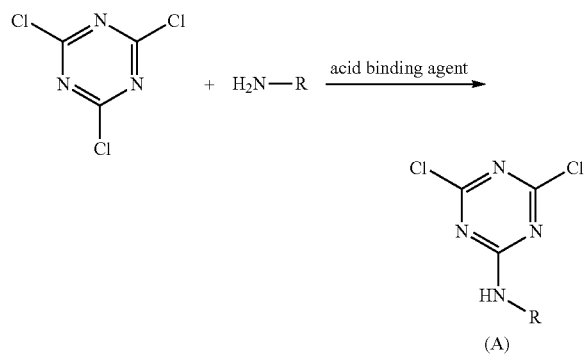

(A)

In the second step, the intermediate A is reacted with N—$R_1$-p-phenylenediamine to prepare an intermediate B, wherein $R_1$ is C3~C10 alkyl, C3~C10 alkyl substituted by C6~C14 aryl or C3~C10 cycloalkyl, C3~C10 cycloalkyl, C3~C10 cycloalkyl substituted by C3~C10 alkyl, C6~C14 aryl or C6~C14 aryl substituted by C3~C10 alkyl;

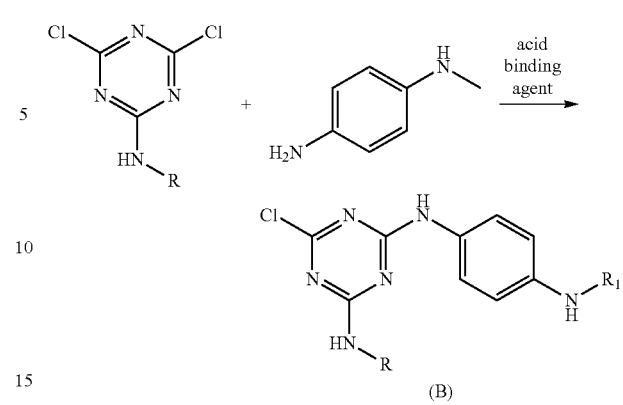

(B)

In the third step, the intermediate B is reacted with N—$R_2$-p-phenylenediamine again to prepare the target product compound of formula (I), wherein $R_2$ is C3~C10 alky, C3~C10 alkyl substituted by C6~C14 aryl or C3~C10 cycloalkyl, C3~C10 cycloalkyl, C3~C10 cycloalkyl substituted by C3~C10 alkyl, C6~C14 aryl or C6~C14 aryl substituted by C3~C10 alkyl;

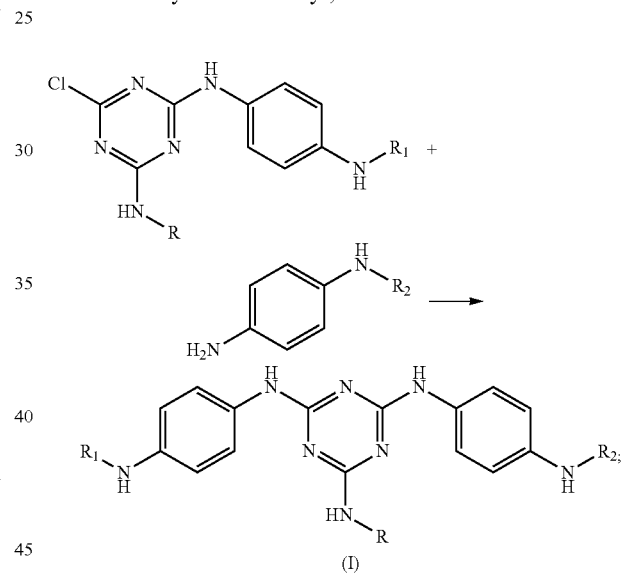

(I)

wherein the preferred R, $R_1$, and $R_2$ in the intermediate A, intermediate B, and compound of formula (I) may be as described in any embodiments herein.

In the first step, in order to improve the conversion rate of cyanuric chloride, excess $NH_2R$ may be used. Compared to cyanuric chloride, $NH_2R$ can generally be in excess of 10% or less. In certain embodiments of the present invention, the excess $NH_2R$ is equal to or less than 8% or equal to or less than 5%. Herein, unless otherwise specified, in an excess amount of a substance means that the added amount of the substance is greater than the added amount of cyanuric chloride. The excess percentage value herein is based on the amount of the substance. For example, when 1 mole of cyanuric chloride is used, an excess of $NH_2R$ of equal to or less than 10% means that 1 mole to 1.1 mole of $NH_2R$ maybe used.

In the reaction of the first step, an alkaline solid powder is usually used as an acid binding agent to neutralize HCl generated during the reaction. The alkaline solid powder suitable for the present invention is not particularly limited, for examples, it can be one or more of sodium carbonate, magnesium carbonate, calcium carbonate, calcium oxide, magnesium oxide, and magnesium hydroxide. Usually, in order to better neutralize HCl, excess basic solid powder can be added in the reaction of the first step. Compared to cyanuric chloride, the excess value of the basic solid powder is not particularly limited, for example, the excess value may be equal to or less than 80%.

The reaction temperature in the first step is usually controlled at 0 to 35° C. The reaction of the first step is usually carried out in a non-polar solvent, such as toluene, xylene, trimethylbenzene, chlorobenzene, methylcyclohexane, dichlorobenzene, trichlorobenzene, dimethylcyclohexane, and trimethylbenzene. The reaction time of the first step can be determined by detecting the progress of the reaction. Herein, the method for detecting the progress of the reaction may be known in the art, such as detecting whether the cyanuric chloride is completely reacted by gas chromatography (GC) or high performance liquid chromatography (HPLC). After the reaction, solid is filtered off to obtain a solution of the intermediate A.

In the second step of the reaction, in order to improve the conversion rate of the intermediate A, excess N—$R_1$-p-phenylenediamine may be used. Compared to cyanuric chloride, N—$R_1$-p-phenylenediamine may generally be in an excess of equal to or less than 20%. In certain embodiments of the present invention, the excess of N—$R_1$-p-phenylenediamine is equal to or less than 10%.

In the second step of the reaction, an alkaline liquid is usually used as an acid binding agent. In the second step, an excessive amount of the alkaline liquid is usually added, for example, an alkali in the alkaline liquid may be in excess of equal to or less than 20% or equal to or less than 10% compared to cyanuric chloride. The alkaline liquid suitable for the present invention is not particularly limited, for example, it can be one or more of sodium hydroxide solution, potassium hydroxide solution, triethylamine, triisopropylamine, N-isopropyldiethylamine, and N,N-diisopropyl ethylamine. In the present invention, when the alkaline liquid is an aqueous solution of an inorganic alkali (such as sodium hydroxide solution, potassium hydroxide solution), its concentration is not particularly limited, usually being 10 wt % to 50 wt %, and for example, 25 wt %.

The reaction temperature of the second step is usually controlled at 50° C. to 100° C. The reaction of the second step is usually carried out in a non-polar solvent, such as toluene, xylene, trimethylbenzene, chlorobenzene, methylcyclohexane, dichlorobenzene, trichlorobenzene, dimethylcyclohexane, or trimethylcyclohexane. The reaction time of the second step may be determined by detecting the progress of the reaction, for example, using a GC or HPLC to detect whether the content of N—$R_1$-p-phenylenediamine continues to decrease. After the reaction, through purification (for example, standing still, removing aqueous phase, or washing with water), a solution of the intermediate B is obtained.

In the third step, in order to improve the conversion rate of intermediate B, excess N—$R_2$-p-phenylenediamine may be used. Compared to cyanuric chloride, N—$R_2$-p-phenylenediamine can generally be in excess of equal to or less than 20%. In certain embodiments of the present invention, the excess of N—$R_2$-p-phenylenediamine is equal to or less than 10%.

The reaction temperature of the third step is usually controlled at 80° C. to 180° C. The third-step reaction is usually carried out in a non-polar solvent, such as toluene, xylene, trimethylbenzene, chlorobenzene, methylcyclohexane, dichlorobenzene, trichlorobenzene, dimethylcyclohexane, or trimethylcyclohexane. The reaction time of the third step may be determined by detecting the progress of the reaction, for example, using a GC or HPLC to detect whether the content of N—$R_2$-p-phenylenediamine continues to decrease. After the reaction is completed, an alkaline liquid (such as sodium hydroxide solution or potassium hydroxide solution) is added to neutralize and remove HCl. After neutralization, the compound of formula (I) is obtained through purification (for example, removing aqueous phase, washing organic phase with water, distilling out solvent from organic substance to obtain a crude product, recrystallizing and purifying the crude product, and drying).

When $R_1$ and $R_2$ of the compound of formula (I) are identical, the second and third steps in the preparation method may be combined into one step, that is, the compound of formula (I) is prepared by reacting the intermediate A with N—$R_1$-p-phenylenediamine.

In the embodiment where the second and third steps are combined into one step (hereinafter referred to as the combined reaction), the amount of N—$R_1$-p-phenylenediamine added to the combined reaction is usually the total amount of the N—$R_1$-p-phenylenediamine added in the second and the third steps of the three-step reaction. The combined reaction is usually carried out in the form of staged temperature control, that is, the reaction is carried out at 50° C. to 100° C. first, and then at 80° C. to 180° C. The timing of switching the reaction temperature may be determined by detecting the reaction progress, for example, when the content of N—$R_1$-p-phenylenediamine is detected by a GC or HPLC to be reduced to half of the added amount, the temperature is switched from within a range of 50° C. to 100° C. to within a range of 80° C. to 180° C. The combined reaction is usually carried out in a non-polar solvent, such as toluene, xylene, trimethylbenzene, chlorobenzene, methylcyclohexane, dichlorobenzene, trichlorobenzene, dimethylcyclohexane, or trimethylcyclohexane. The total time of the combined reaction may be determined by detecting the progress of the reaction, such as using a GC or HPLC to detect whether the content of N—$R_1$-p-phenylenediamine continues to decrease. In the combined reaction, an alkaline liquid (such as a one or more of sodium hydroxide solution, potassium hydroxide solution, triethylamine, triisopropylamine, N-isopropyldiethylamine, N,N-diisopropylethylamine, etc.) is usually used as an acid binding agent. After the reaction is completed, an alkaline liquid may be added to neutralize and remove HCl, and the compound of formula (I) is obtained after purification (for example, removing aqueous phase, washing organic phase with water, distilling out solvent from organic substance to obtain a crude product, recrystallizing and purifying the crude product, and drying).

The compound of the present invention provides improved aging resistance and discoloration resistance for rubber compositions. Accordingly, the present invention also provides a rubber composition comprising one or more of the compounds of formula I described herein. Typically, the rubber composition also comprises a diene elastomer, a reinforcing filler, and a crosslinker.

A diene elastomer refers to an elastomer with its monomers comprising a diene (such as butadiene and isoprene). Diene elastomers suitable for the present invention are known in the field, including, but not limited to, one or more selected from natural rubber (NR), butadiene rubber (BR), isoprene rubber, styrene butadiene rubber (SBR), chloroprene rubber (CR), nitrile butadiene rubber (NBR), isoprene/butadiene copolymer, isoprene/styrene copolymer, and isoprene/butadiene/styrene copolymer. In some embodiments, in the rubber composition of the present invention, the diene elastomer consists of natural rubber (such as SCR5) and butadiene rubber (such as BR9000), and the mass ratio of the natural rubber to the butadiene rubber may be in the ranges of from 1:9 to 9:1, from 2:8 to 8:2, from 3:7 to 7:3, from 4:6 to 6:4, from 4.5:5.5 to 5.5:4.5, or 1:1.

Usually, based on 100 parts by mass of diene elastomer, in the rubber composition, the amount of the compound of formula (I) is 0.1 to 5 parts by mass, such as 1 to 5 parts by mass, 1.5 to 3.5 parts by mass, or 2 to 3 parts by mass.

The rubber composition may also comprise other conventionally used components, including, but not limited to, reinforcing fillers, aids, crosslinkers, and promoters. The amounts of reinforcing fillers, aids, crosslinkers, and promoters may be conventional amounts known in the art.

Reinforcing fillers may be carbon black, titanium oxide, magnesium oxide, calcium carbonate, magnesium carbonate, aluminum hydroxide, magnesium hydroxide, clay, talc and so on. Generally, reinforcing fillers are used in an amount of 40 to 60 parts by weight per 100 parts by weight of diene elastomer.

Aids may include softeners used to improve processability and other properties. Softeners may include petroleum softeners, such as aromatic oil, processing oil, lubricating oil, paraffin, liquid paraffin, petroleum asphalt, and vaseline, and/or fatty oil softeners, such as castor oil, flaxseed oil, rapeseed oil, coconut oil, wax (e.g., beeswax, carnauba wax, and lanolin), tall oil, linoleic acid, palmitic acid, stearic acid and lauric acid, etc. Aids may also include activators, such as zinc oxide, which can speed up the vulcanization rate and improve the thermal conductivity, wear resistance, and tear resistance of rubber. Usually, 5 to 20 parts by mass of aids are used per 100 parts by mass of diene elastomer, for example, 2 to 8 parts by mass of aromatic oil, 2 to 8 parts by mass of zinc oxide, and 1 to 4 parts by mass of stearic acid are used.

A crosslinker may be sulfur. Generally, crosslinkers are used in an amount of 1 to 3 parts by weight per 100 parts by weight of diene elastomer.

Promoters are generally vulcanization accelerators, which may be selected from at least one of sulfonamide, thiazole, thiuram, thiourea, guanidine, dithiocarbamate, aldimine, aldehyde ammonia, imidazoline, and xanthic acid vulcanization accelerators. For example, the promoter may be N-tert-butylbenzothiazole-2-sulphenamide (NS). Generally, promoters are used in an amount of 0.5 to 1.5 parts by weight per 100 parts by weight of diene elastomer.

In addition, when necessary, a plasticizer may be used in the rubber composition of the present invention, which includes, but not limited to, dimethyl phthalate (DMP), diethyl phthalate (DEP), dibutyl phthalate (DBP), diheptyl phthalate (DHP), dioctyl phthalate (DOP), di-isononyl phthalate (DINP), di-isodecyl phthalate (DIDP), butyl benzyl phthalate (BBP), dilauryl phthalate (DWP), and dicyclohexyl phthalate (DCHP), etc. The plasticizer may be used in a conventional amount that is known in the art.

The rubber product of the present invention may be prepared by conventional methods. For example, it may be prepared by a two-stage mixing method as follows: in the first stage, an internal mixer is used to mix diene elastomers, reinforcing fillers, aids and anti-degradants, and the rubber discharge temperature is 110° C. or higher; in the second stage, an open mill is used to mix the rubber with sulfur and promoters.

Generally, a diene elastomer is added into a thermo-mechanical mixer, such as an internal mixer at first. After kneading for a while, a reinforcing filler, an aid, and an anti-degradant are added, and the mixture is kept on being kneaded until the mixture is homogeneous. The reinforcing filler, the aid, and the anti-degradant may be added in batches. The temperature during kneading is controlled to between 110° C. and 190° C., preferably between 150° C. and 160° C. Then, the mixture is cooled to 100° C. or lower. A crosslinker and a promoter are added to the mixture and a second kneading is performed during which the temperature is controlled to 110° C. or lower, e.g., 70° C., and an unvulcanized rubber is obtained. Tablet pressing may be carried out on the kneaded rubber composition before vulcanization. The unvulcanized rubber of the present invention may be vulcanized by a conventional vulcanization method to obtain a vulcanized rubber. The vulcanization (curing) temperature is generally 130° C. to 200° C., such as 145° C. The vulcanization time depends on the vulcanization temperature, vulcanization system, and vulcanization kinetics, and is generally from 15 minutes to 60 minutes, such as 30 minutes.

When the compound of the present invention is used in rubber articles, especially rubber tires, it renders the rubber articles or rubber tires more excellent anti-aging properties; in addition, compared with the existing anti-degradant products, the rubber articles or rubber tires comprising the compound of the present invention is not easy to cause surface pollution and discoloration, and has excellent discoloration resistance. Therefore, the present invention also provides a rubber article prepared by using the rubber composition described herein as a rubber component. The rubber article may be a tire, a rubber overshoe, a sealing strip, an acoustic panel, or a crash pad. In some embodiments, the rubber article is a tire, such as tread, a belt ply, and a sidewall of a tire. As a belt ply of a tire, the rubber article may further comprise a reinforcing material conventionally used in the art in addition to the rubber composition of the present invention. The present invention also provides the use of the rubber compositions described herein in improving the aging resistance and/or discoloration resistance of a rubber or a rubber article.

The present invention is illustrated by way of specific examples below. It should be understood that these examples are merely explanatory and is not intended to limit the scope of the present invention. Unless otherwise specified, the methods, reagents, and materials used in the examples are conventional in the art. The formulations used in the examples are commercially available.

Preparation Example 1: Preparation of 2-isopropylamine-4,6-bis(4-anilinoaniline)-1,3,5-triazine (Compound I-1)

(1) Synthesis of Intermediate A1

118.1 g cyanuric chloride (0.64 mol) is dissolved in 360 g toluene, 74.2 g sodium carbonate solid powder is added, 39.6 g toluene solution of isopropylamine (0.67 mol isopropylamine+80 g toluene) is added dropwise under vigorous stirring at 10° C. for 1.5 h, and the reaction is continued for 1.5 h after dropping. Samples are taken for GC detection, and when cyanuric chloride can not be detected, the reaction is stopped. The solid is filtered out, and a colorless and transparent solution of intermediate A1 is obtained.

(2) Synthesis of Intermediate B11

142.6 g N-phenyl-p-phenylenediamine (0.77 mol) is dissolved in 180 g toluene, the solution is heated to 65° C., the toluene solution of the intermediate A1 obtained in step (1) is added dropwise with vigorous stirring, at the same time 112.6 g sodium hydroxide solution (25 wt %) is added dropwise for 1~2 h, and the temperature is kept for 1 h. Samples are took for GC detection, and when the content of N-phenyl-p-phenylenediamine is no longer decreased, the reaction is stopped and left standing. The aqueous phase is removed to obtain a toluene solution containing intermediate B11.

(3) Synthesis of Compound I-1

132.5 g N-phenyl-p-phenylenediamine (0.72 mol) is added to the toluene solution of intermediate B11 obtained in step (2), and the mixture is heated to 80° C. for reaction. GC detection is performed, and when the content of N-phenyl-p-phenylenediamine is no longer decreased, the temperature is lowered, and the reaction is stopped. 112.6 g sodium hydroxide solution (25 wt %) is added for neutralization, the aqueous phase is removed, the organic phase is washed with water, and then toluene is distilled out to obtain a crude product. Then the crude product is recrystallized with petroleum ether, and dried to obtain 289.2 g (yield 90%) 2-isopropylamine-4,6-bis(4-anilinoaniline)-1,3,5-triazine (compound I-1).

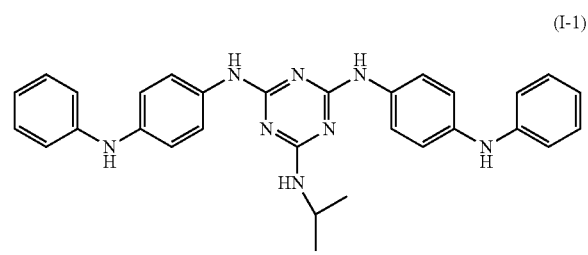 [SMILES: CC(C)Nc1nc(Nc2ccc(Nc3ccccc3)cc2)nc(Nc2ccc(Nc3ccccc3)cc2)n1]
(I-1)

(2) Synthesis of Intermediate B12

152.4 g N-1,4-dimethylpentyl-p-phenylenediamine (0.74 mol) is dissolved in 180 g xylene, the solution is heated to 70° C., xylene solution of the intermediate A1 obtained in step (1) is added dropwise with vigorous stirring, at the same time 157.6 g potassium hydroxide solution (25 wt %) is added dropwise for 1~2 h, and the temperature is kept for 1 h. Samples are took for GC detection, and when the content of N-1,4-dimethylpentyl-p-phenylenediamine is no longer reduced, the reaction is stopped and left standing. The aqueous phase is removed to obtain a xylene solution containing intermediate B12.

(3) Synthesis of Compound I-2

152.5 g N-1,4-dimethylpentyl-p-phenylenediamine (0.74 mol) is added to the xylene solution of the intermediate B12 obtained in step (2), and the mixture is heated to 110° C. for reaction. GC detection is performed, and when the content of N-1,4-dimethylpentyl-p-phenylenediamine is no longer decreased, the temperature is lowered, and the reaction is stopped. 112.6 g sodium hydroxide solution (25 wt %) is added for neutralization, the organic phase is washed with water, and then xylene is distilled out to obtain a crude product. Then the crude product is recrystallized with petroleum ether and dried to obtain 283 g (yield 81%) 2-isopropylamine-4,6-bis(4-(1,4-dimethylpentylamino)aniline)-1,3,5-triazine (compound I-2).

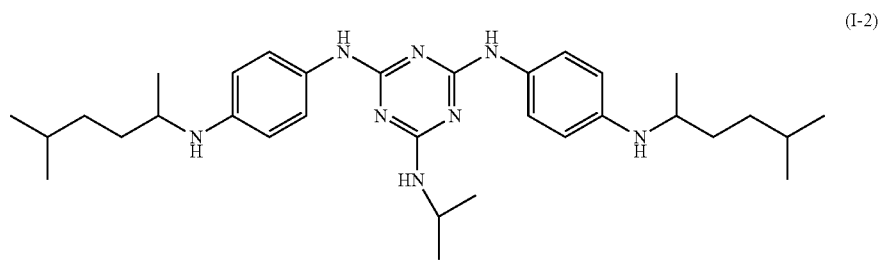 [SMILES: CC(C)CCC(C)Nc1ccc(Nc2nc(Nc3ccc(NC(C)CCC(C)C)cc3)nc(NC(C)C)n2)cc1]
(I-2)

Property of compound I-1: blue solid.

$^1$H-HMR (400 MHz, DMSO-D$_6$, δ ppm): 8.71 (s, 2H), 7.93 (s, 2H), 7.64 (br, 4H), 7.17 (t, 4H), 6.99 (q, 8H), 6.73 (t, 2H), 6.31 (s, 1H), 3.4 (s, 1H), 1.41 (s, 6H).

Preparation Example 2: Preparation of 2-isopropylamine-4,6-bis(4-(1,4-dimethylpentylamino)aniline)-1,3,5-triazine (Compound I-2)

(1) Synthesis of Intermediate A1

118.1 g cyanuric chloride (0.64 mol) is dissolved in 360 g xylene, 71.2 g ultrafine calcium carbonate solid powder is added, 38.4 g xylene solution of isopropylamine (0.65 mol isopropylamine+80 g xylene) is added dropwise under vigorous stirring at 10° C. for 1.5 h, and the reaction is continued for 1.5 h after dropping. Samples are taken for GC detection, and when cyanuric chloride can not be detected, the reaction is stopped. Solid is filtered out, and a colorless and transparent intermediate A1 solution is obtained.

Property of compound I-2: purple-brown solid.

$^1$H-HMR (400 MHz, DMSO-D6, δ ppm): 8.39 (s, 2H), 7.32 (d, 4H), 6.48 (d, 4H), 6.09 (S, 1H), 4.92 (t, 3H), 3.31-3.21 (m, 2H), 1.56-1.43 (m, 4H), 1.42-1.13 (m, 12H), 1.06 (d, 6H), 0.85 (q, 12H).

Preparation Example 3: Preparation of 2-tert-butylamine-4,6-bis(4-anilinoaniline)-1,3,5-triazine (Compound I-3)

(1) Synthesis of Intermediate A2

118.1 g cyanuric chloride (0.64 mol) is dissolved in 360 g trimethylbenzene, 71.2 g ultrafine magnesium carbonate solid powder is added, 49.1 g trimethylbenzene solution of tert-butylamine (0.67 mol tert-butylamine+80 g toluene) is added dropwise under vigorous stirring at 15° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A2 is obtained.

(2) Synthesis of Intermediate B21

131.5 g N-phenyl-p-phenylenediamine (0.71 mol) is dissolved in 180 g trimethylbenzene, the solution is heated to 65° C., the trimethylbenzene solution of the intermediate A2 obtained in step (1) is added dropwise with vigorous stirring, at the same time 71.1 g triethylamine is added dropwise for 1~2 h, and the temperature is kept for 1 h. Samples are took for GC detection, and when the content of N-phenyl-p-phenylenediamine is no longer decreased, the reaction is stopped. After washing with water, a trimethylbenzene solution containing intermediate B21 is obtained.

(3) Synthesis of Compound I-3

123.3 g N-phenyl-p-phenylenediamine (0.67 mol) is added to the trimethylbenzene solution of intermediate B21 obtained in step (2), and the mixture is heated to 105° C. for reaction. GC detection is performed, and when the content of N-phenyl-p-phenylenediamine is no longer decreased, the temperature is lowered, and the reaction is stopped. 71.1 g triethylamine is added for neutralization, and after washing with water, trimethylbenzene is distilled out to obtain a crude product. Then the crude product is recrystallized with petroleum ether, and dried to obtain 280 g (yield 85%) 2-tert-butylamine-4,6-bis(4-anilinoaniline)-1,3,5-triazine (compound I-3).

(I-3)

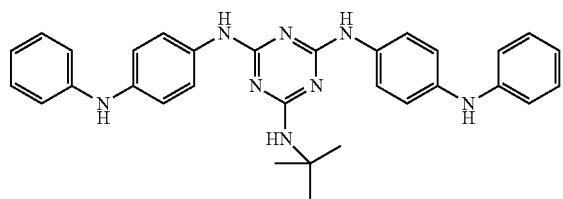

Property of compound I-3: dark blue solid.
$^1$H-NMR (400 MHz, DMSO-D6, δ PPm): 8.71 (s, 2H), 7.93 (s, 2H), 7.64 (br, 4H), 7.17 (t, 4H), 6.99 (q, 8H), 6.73 (t, 2H), 6.31 (s, 1H), 1.41 (s, 9H).

Preparation Example 4: Preparation of 2-tert-butylamine-4,6-bis(4-isopropylaminoaniline)-1,3,5-triazine (Compound I-4)

(1) Synthesis of Intermediate A2

118.1 g cyanuric chloride (0.64 mol) is dissolved in 360 g chlorobenzene, 64 g calcium oxide solid powder is added, 49.1 g toluene solution of tert-butylamine (0.67 mol tert-butylamine+80 g chlorobenzene) is added dropwise under vigorous stirring at 15° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A2 is obtained.

(2) Synthesis of Intermediate B22

105 g N-isopropyl-p-phenylenediamine (0.7 mol) is dissolved in 180 g chlorobenzene, the solution is heated to 60° C., the chlorobenzene solution of the intermediate A2 obtained in step (1) is added dropwise with vigorous stirring, at the same time 100.5 g triisopropylamine is added dropwise for 1~2 h, and the temperature is kept for 1 h. Samples are took for GC detection, and when the content of N-isopropyl-p-phenylenediamine is no longer decreased, the reaction is stopped and left standing. The aqueous phase is removed to obtain a chlorobenzene solution containing intermediate B22.

(3) Synthesis of Compound I-4

114 g N-isopropyl-p-phenylenediamine (0.76 mol) is added to the chlorobenzene solution of intermediate B22 obtained in step (2), and the mixture is heated to 80° C. for reaction. GC detection is performed, and when the content of N-isopropyl-p-phenylenediamine is no longer decreased, the temperature is lowered, and the reaction is stopped. 112.6 g sodium hydroxide solution (25 wt %) is added for neutralization, the organic phase is washed with water, and then chlorobenzene is distilled out to obtain a crude product. Then the crude product is recrystallized with petroleum ether and dried to obtain 258 g (yield 90%) 2-tert-butylamine-4,6-bis(4-isopropylaminoaniline)-1,3,5-triazine (compound I-4).

(I-4)

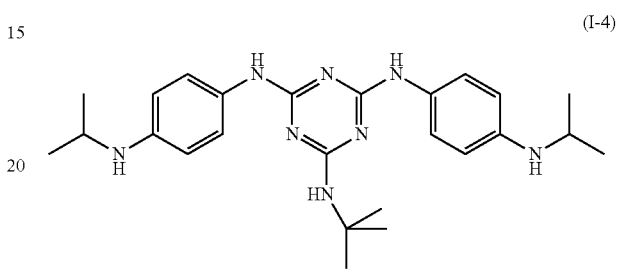

Property of compound I-4: purple-brown solid.
$^1$H-HMR (400 MHz, DMSO-D6, δ ppm): 8.29 (s, 2H), 7.33 (d, 4H), 6.44 (d, 4H), 6.02 (S, 1H), 4.92 (d, 2H), 3.4 (d, 2H), 1.42-1.13 (m, 9H), 0.85 (q, 12H).

Example 5: 2-tert-butylamine-4,6-bis(4-(1,4-dimethylpentylamino)aniline)-1,3,5-triazine (Compound I-5)

(1) Synthesis of Intermediate A2

118.1 g cyanuric chloride (0.64 mol) is dissolved in 360 g dichlorobenzene, 38.4 g ultrafine magnesium oxide solid powder is added, 51.3 g dichlorobenzene solution of tert-butylamine (0.7 mol tert-butylamine+80 g dichlorobenzene) is added dropwise under vigorous stirring at 20° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A2 is obtained.

(2) Synthesis of Intermediate B23

144.2 g N-1,4-dimethylpentyl-p-phenylenediamine (0.7 mol) is dissolved in 180 g dichlorobenzene, the solution is heated to 70° C., dichlorobenzene solution of the intermediate A2 obtained in step (1) is added with vigorous stirring, at the same time 157.6 g potassium hydroxide solution (25 wt %) is added dropwise for 1~2 h, and the temperature is kept for 1 h. Samples are took for GC detection, and when the content of N-1,4-dimethylpentyl-p-phenylenediamine is no longer decreased, the reaction is stopped and left standing. The aqueous phase is removed to obtain a dichlorobenzene solution containing intermediate B23. (3) Synthesis of Compound I-5

148.4 g N-1,4-dimethylpentyl-p-phenylenediamine (0.72 mol) is added to the dichlorobenzene solution of intermediate B23 obtained in step (2), and the mixture is heated to 150° C. for reaction. GC detection is performed, and when the content of N-1,4-dimethylpentyl-p-phenylenediamine is no longer decreased, the temperature is lowered, and the reaction is stopped. 112.6 g sodium hydroxide solution (25 wt %) is added for neutralization to obtain a crude product. Then the crude product is recrystallized with petroleum ether, and dried to obtain 286.7 g (yield 80%) 2-tert-butylamine-4,6-bis(4-(1,4-dimethylpentylamino)aniline)-1,3,5-triazine (compound I-5).

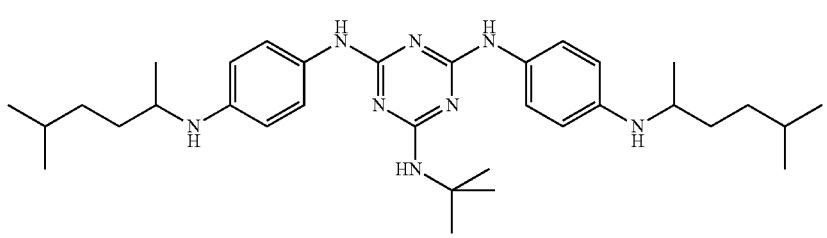

(I-5)

Property of compound I-5: dark purple solid.

¹H-NMR (400 MHz, DMSO-D6, δ ppm): 8.29 (s, 2H), 7.33 (d, 4H), 6.44 (d, 4H), 6.02 (S, 1H), 4.92 (d, 2H), 3.31-3.21 (m, 2H), 1.56-1.43 (m, 4H), 1.42-1.13 (m, 15H), 1.06 (d, 6H), 0.85 (q, 12H).

Preparation Example 6: 2-tert-butylamine-4-(4-anilinoaniline)-6-(4-(1,4-dimethylpentylamino)aniline)-1,3,5-triazine (Compound I-6)

(1) Synthesis of Intermediate A2

118.1 g cyanuric chloride (0.64 mol) is dissolved in 360 g methylcyclohexane, 71.2 g ultrafine magnesium hydroxide solid powder is added, 49.1 g methylcyclohexane solution of tert-butylamine (0.67 mol tert-butylamine+80 g methylcyclohexane) is added dropwise under vigorous stirring at 20° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A2 is obtained.

(2) Synthesis of Intermediate B21

124.0 g N-phenyl-p-phenylenediamine (0.67 mol) is dissolved in 180 g methylcyclohexane, the solution is heated to 50° C., the methylcyclohexane solution of the intermediate A2 obtained in step (1) is added dropwise with vigorous stirring, at the same time 157.6 g potassium hydroxide solution (25 wt %) is added dropwise for 1~2 h, and the temperature is kept for 1 h. Samples are took for GC detection, and when the content of N-phenyl-p-phenylenediamine remains unchanged, the reaction is stopped. After washing with water, a methylcyclohexane solution containing intermediate B21 is obtained.

(3) Synthesis of Compound I-6

131.9 g N-1,4-dimethylpentyl-p-phenylenediamine (0.64 mol) is added to the methylcyclohexane solution of the intermediate B21 obtained in step (2), and the mixture is heated to 160° C. for reaction. GC detection is performed, and when the content of N-1,4-dimethylpentyl-p-phenylenediamine is no longer reduced, the temperature is lowered, and the reaction is stopped. 112.6 g of sodium hydroxide (25 wt %) is added for neutralization. After washing with water, methylcyclohexane is distilled out to obtain a crude product. Then the crude product is recrystallized with petroleum ether and dried to obtain 261.7 g (yield 76%) 2-tert-butylamine-4-(4-anilinoaniline)-6-(4-(1,4-dimethylpentylamino) aniline)-1,3,5-triazine (compound I-6).

(I-6)

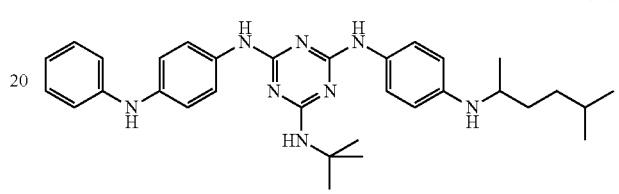

Property of compound I-6: dark purple solid.

¹H-NMR (400 MHz, DMSO-D6, δ PPm): 8.56 (d, 2H), 7.90 (s, 1H), 7.68 (d, 2H), 7.39 (d, 2H), 7.21 (t, 2H), 7.02 (t, 4H), 6.79 (t, 1H), 6.52 (d, 2H), 6.22 (s, 1H), 5.0 (d, 1H), 3.37 (m, 1H), 1.6-1.45 (m, 2H), 1.43 (s, 9H), 1.31-1.18 (m, 3H), 1.11 (d, 3H), 0.89 (q, 6H).

Example 7: 2-tert-octylamine-4,6-bis(4-anilinoaniline)-1,3,5-triazine (Compound I-7)

(1) Synthesis of Intermediate A3

118.1 g cyanuric chloride (0.64 mol) is dissolved in 360 g trichlorobenzene, 71.2 g sodium carbonate solid powder is added, 86.5 g trichlorobenzene solution of tert-octylamine (0.67 mol tert-octylamine+80 g trichlorobenzene) is added dropwise under vigorous stirring at 30° C. for 1.5 h, and the reaction is continued for 1.5 h after dripping. Samples are taken for GC detection, and when cyanuric chloride can not be detected, the reaction is stopped. Solid is filtered out, and a colorless and transparent solution of intermediate A3 is obtained.

(2) Synthesis of Intermediate B31

129.6 g N-phenyl-p-phenylenediamine (0.7 mol) is dissolved in 180 g trichlorobenzene, the mixture is heated to 70° C., the trichlorobenzene solution of the intermediate A3 obtained in step (1) is added dropwise with vigorous stirring, at the same time 157.6 g potassium hydroxide (25 wt %) is add dropwise for 1~2 h, and the temperature is kept for 1 h. Samples are took for GC detection, and when the content of N-phenyl-p-phenylenediamine is no longer decreased, the reaction is stopped and left standing. The aqueous phase is removed to obtain a trichlorobenzene solution containing intermediate B31.

(3) Synthesis of Compound I-7

136.2 g N-phenyl-p-phenylenediamine (0.74 mol) is added to the trichlorobenzene solution of the intermediate B31 obtained in step (2), the mixture is heated to 105° C. for reaction. GC detection is performed, and when the content of N-phenyl-p-phenylene is no longer decreased, the temperature is lowered, and the reaction is stopped. 112.6 g sodium hydroxide solution (25 wt %) is added for neutralization, the aqueous phase is removed, the organic phase is distilled to remove trichlorobenzene, and a crude product is obtained. Then the crude product is recrystallized with petroleum ether and dried to obtain 322.1 g (yield 88%) 2-tert-octylamine-4,6-bis(4-anilinoaniline)-1,3,5-triazine (compound I-7).

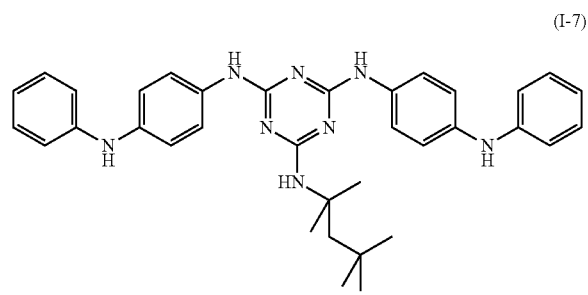 [SMILES: CC(C)(C)CC(C)(C)Nc1nc(Nc2ccc(Nc3ccccc3)cc2)nc(Nc2ccc(Nc3ccccc3)cc2)n1]

(I-7)

Property of compound I-7: blue-brown solid.
$^1$H-NMR (400 MHz, DMSO-D6, δ ppm): 8.6 (d, 2H), 7.95 (s, 2H), 7.63 (s, 4H), 7.16 (t, 4H), 6.99 (q, 8H), 6.72 (t, 2H), 6.17 (br, 1H), 1.9 (s, 2H), 1.42 (s, 6H), 0.96 (s, 9H).

Example 8: 2-tert-octylamine-4,6-bis(4-isopropylaminoaniline)-1,3,5-triazine (Compound I-8)

(1) Synthesis of Intermediate A3

118.1 g cyanuric chloride (0.64 mol) is dissolved in 360 g dimethylcyclohexane, 71.2 g ultrafine sodium carbonate solid powder is added, 86.5 g dimethylcyclohexane solution of tert-octylamine (0.67 mol tert-octylamine+80 g dimethylcyclohexane) is added dropwise under vigorous stirring at 30° C. for 1.5 h, and the reaction is continued to react for 1.5 h after dropping. Samples are taken for GC detection, and when cyanuric chloride can not be detected, the reaction is stopped. Solid is filtered out, and a colorless transparent solution of intermediate A3 is obtained.

(2) Synthesis of Intermediate B32

105 g N-isopropyl-p-phenylenediamine (0.7 mol) is dissolved in 180 g dimethylcyclohexane, the solution is heated to 65° C., the dimethylcyclohexane solution of the intermediate A3 obtained in step (1) is added dropwise with vigorous stirring, at the same time 112.6 g sodium hydroxide solution (25 wt %) is added dropwise for 1~2 h, and the temperature is kept for 1 h. Samples are took for GC detection, and when the content of N-isopropyl-p-phenylenediamine is no longer decreased, the reaction is stopped and left standing. The aqueous phase is removed to obtain a dimethylcyclohexane solution containing intermediate B32.

(3) Synthesis of Compound I-8

108 g N-isopropyl-p-phenylenediamine (0.72 mol) is added to the dimethylcyclohexane solution of the intermediate B32 obtained in step (2), and the mixture is heated to 90° C. for reaction. GC detection is performed, and when the content of propyl-p-phenylenediamine is no longer decreased, the temperature is lowered, and the reaction is stopped. 112.6 g sodium hydroxide solution (25 wt %) is added for neutralization, the organic phase is washed with water, and then dimethylcyclohexane is distilled out to obtain a crude product. Then the crude product is recrystallized with petroleum ether and dried to obtain 293.5 g (yield 91%) 2-tert-octylamine-4,6-bis(4-isopropylaminoaniline)-1,3,5-triazine (Compound I-8).

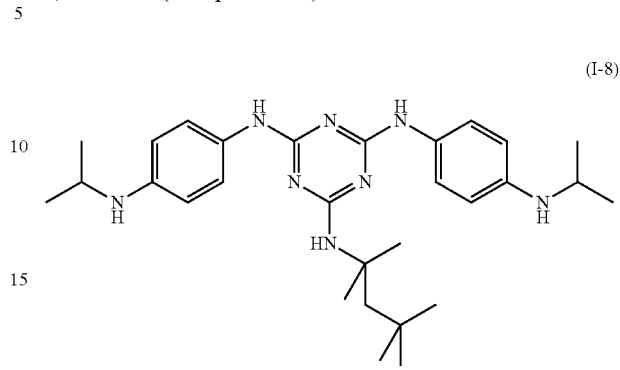

(I-8)

Property of compound I-8: purple-brown solid.
$^1$H-HMR(400 MHz, DMSO-D6, δ ppm): 8.29 (s, 2H), 7.33 (d, 4H), 6.44 (d, 4H), 6.02 (S, 1H), 4.92 (d, 2H), 3.4 (d, 2H), 1.9 (s, 2H), 1.42-1.13 (m, 18H), 0.96 (s, 9H).

Example 9: 2-tert-octylamine-4-(4-anilinoaniline)-6-(4-isopropylaminoaniline)-1,3,5-triazine (Compound I-9)

(1) Synthesis of Intermediate A3

118.1 g cyanuric chloride (0.64 mol) is dissolved in 360 g trimethylcyclohexane, 71.2 g sodium carbonate solid powder is added, 86.5 g trimethylcyclohexane solution of tert-octylamine (0.67 mol tert-octylamine+80 g trimethylcyclohexane) is added dropwise under vigorous stirring at 35° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A3 is obtained.

(2) Synthesis of Intermediate B31

129.6 g N-phenyl-p-phenylenediamine (0.7 mol) is dissolved in 180 g trimethylcyclohexane, the solution is heated to 70° C., the trimethylcyclohexane solution of the intermediate A3 obtained in step (1) is added dropwise under vigorous stirring, at the same time 157.6 g potassium hydroxide (25 wt %) is added dropwise for 1~2 h, and the temperature is kept for 1 h. Samples are took for GC detection, and when the content of N-phenyl-p-phenylenediamine is no longer decreased, the reaction is stopped and left standing. The aqueous phase is removed to obtain a trimethylcyclohexane solution containing intermediate B31.

(3) Synthesis of Compound I-9

105 g N-isopropyl-p-phenylenediamine (0.7 mol) is added to the trimethylcyclohexane solution of the intermediate B31 obtained in step (2), and the mixture is heated to 100° C. for reaction. GC detection is performed, and when the content of propyl-p-phenylenediamine is no longer decreased, the temperature is lowered, and the reaction is stopped. 112.6 g sodium hydroxide solution (25 wt %) is added for neutralization, and after washing with water, trimethylcyclohexane is distilled out to obtain a crude product. Then the crude product is recrystallized with petroleum ether and dried to obtain 296.7 g (yield 85%) 2-tert-octylamine-4-(4-anilinoaniline)-6-(4-isopropylaminoaniline)-1,3,5-triazine (compound I-9).

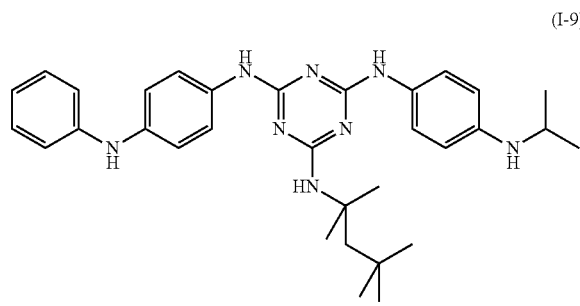 [SMILES: CC(C)Nc1ccc(Nc2nc(Nc3ccc(Nc4ccccc4)cc3)nc(NC(C)(C)CC(C)(C)C)n2)cc1]
(I-9)

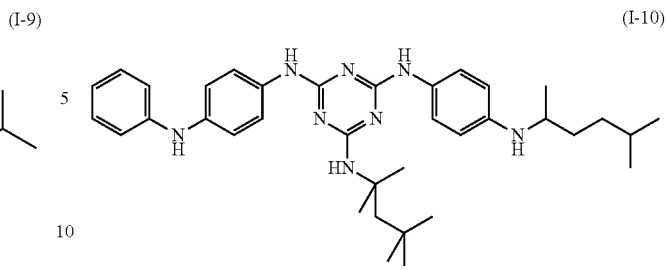
(I-10)

Property of compound I-9: purple-brown solid.

¹H-HMR(400 MHz, DMSO-D6, δ ppm): 8.47 (q, 2H), 7.93 (s, 1H), 7.6 (s, 2H), 7.38 (s, 2H), 7.17 (t, 2H), 6.9 (t, 4H), 6.77 (t, 1H), 6.45 (d, 2H), 6.14 (d, 1H), 4.95 (d, 1H), 3.29 (m, 1H), 1.50 (m, 2H), 1.41-1.31 (m, 12H), 0.95 (s, 9H).

Example 10: 2-tert-octylamine-4-(4-anilinoaniline)-6-(4-(1,4-dimethylamylamino)aniline)-1,3,5-triazine (Compound I-10)

(1) Synthesis of Intermediate A3

118.1 g cyanuric chloride (0.64 mol) is dissolved in 360 g xylene, 71.2 g sodium carbonate solid powder is added, 86.5 g xylene solution of tert-octylamine (0.67 mol of tert-octylamine +80 g of xylene) is added dropwise under vigorous stirring at 35° C. for 1.5 h, and the reaction is continued for 1.5 h after dropping. Samples are taken for GC detection, and when cyanuric chloride can not be detected, the reaction is stopped. Solid is filtered out the solid, and a colorless and transparent solution of intermediate A3 is obtained.

(2) Synthesis of Intermediate B31

129.6 g N-phenyl-p-phenylenediamine (0.7 mol) is dissolve in 180 g xylene, the solution is heated to 80° C., the xylene solution of the intermediate A3 obtained in step (1) is added dropwise with vigorous stirring, at the same time 157.6 g potassium hydroxide (25 wt %) is added dropwise for 1~2 h, and the temperature is kept for 1 h. Samples are took for HPLC detection, and when intermediate A3 can not be detected, the reaction is stopped. After washing with water, a xylene solution containing intermediate B31 is obtained (3) Synthesis of Compound I-10

131.9 g N-1,4-dimethylpentyl-p-phenylenediamine (0.64 mol) is added to the xylene solution of the intermediate B31 obtained in step (2), and the mixture is heated to 110° C. for reaction. GC detection is performed, and when the content of N-1,4-dimethylpentyl-p-phenylenediamine is no longer decreased, the temperature is lowered, and the reaction is stopped. 112.6 g sodium hydroxide solution (25 wt %) is added for neutralization. After washing with water, xylene is distilled out to obtain a crude product Then the crude product is recrystallized with petroleum ether and dried to obtain 288.9 g (yield 76%) 2-tert-octylamine-4-(4-anilinoaniline)-6-(4-(1,4-dimethylpentylamino)aniline)-1,3,5-triazine (compound I-10).

Property of compound I-10: dark purple solid.

¹H-NMR (400 MHz, DMSO-D6, δ ppm): 8.49 (q, 2H), 7.91 (s, 1H), 7.64 (s, 2H), 7.34 (s, 2H), 7.17 (t, 2H), 6.98 (t, 4H), 6.73 (t, 1H), 6.48 (d, 2H), 6.04 (d, 1H), 4.95 (d, 1H), 3.29 (m, 1H), 1.89 (s, 1H), 1.50 (m, 2H), 1.40 (s, 6H), 1.31-1.18 (m, 4H), 1.07 (d, 3H), 0.95 (s, 9H), 0.86 (q, 6H).

Example 11: 2-tert-octylamine-4-(4-isopropylaminoaniline)-6-(4-(1,4-dimethylpentylamino)aniline)-1,3,5-triazine (Compound I-11)

(1) Synthesis of Intermediate A3

118.1 g cyanuric chloride (0.64 mol) is dissolved in 360 g xylene, 71.2 g sodium carbonate solid powder is added, 86.5 g xylene solution of tert-octyl amine (0.67 mol tert-octyl amine+80 g xylene) is added dropwise under vigorous stirring at 35° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A3 is obtained.

(2) Synthesis of Intermediate B32

105 g N-isopropyl-p-phenylenediamine (0.7 mol) is dissolved in 180 g xylene, the solution is heated to 65° C., the xylene solution of the intermediate A3 obtained in step (1) is added dropwise with vigorous stirring, at the same time 112.6 g sodium hydroxide solution (25 wt %) is added dropwise for 1~2 h, and the temperature is kept for 1 h. Samples are took for GC detection, and when intermediate A3 can not be detected, the reaction is stopped and left standing. The aqueous phase is removed to obtain a xylene solution containing intermediate B32.

(3) Synthesis of Compound I-11

144.2 g N-1,4-dimethylpentyl-p-phenylenediamine (0.7 mol) is added to the xylene solution of the intermediate B32 obtained in step (2), and the mixture is heated to 120° C. for reaction. GC detection is performed, and when the content of N-1,4-dimethylpentyl-p-phenylenediamine is no longer decreased, the temperature is lowered, and the reaction is stopped. 112.6 g sodium hydroxide solution (25 wt %) is added for neutralization, the organic phase is washed with water, and xylene is distilled out to obtain a crude product. Then the crude product is recrystallized with petroleum ether and dried to obtain 286.7 g (yield 80%) 2-tert-octylamine-4-(4-isopropylaminoaniline)-6-(4-(1,4-dimethylpentylamino)aniline)-1,3,5-triazine (compound I-11).

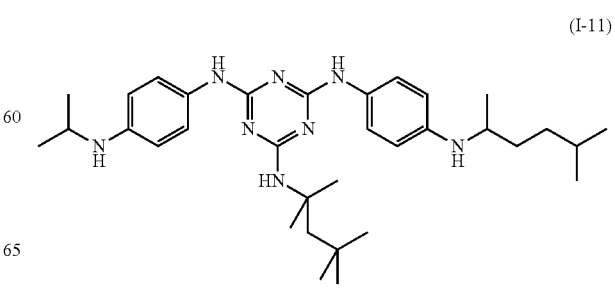
(I-11)

Property of compound I-11: purple-brown viscous solid.
$^1$H-HMR(400 MHz, DMSO-D6, δ ppm): 8.32 (d, 2H), 7.39 (s, 4H), 6.49 (d, 4H), 6.04 (br, 1H), 4.99 (t, 3H), 3.21-3.32 (m, 2H), 1.36-1.15 (m, 15H), 1.08-1.13 (d, 6H), 1.02 (s, 9H), 0.91 (q, 6H).

Example 12: 2-tert-octylamine-4,6-bis(4-(1,4-dimethylpentylamino)aniline)-1,3,5-triazine (Compound I-12)

(1) Synthesis of Intermediate A3

118.1 g cyanuric chloride (0.64 mol) is dissolved in 360 g xylene, 71.2 g sodium carbonate solid powder is added, 86.5 g xylene solution of tert-octyl amine (0.67 mol tert-octyl amine+80 g xylene) is added dropwise under vigorous stirring at 25° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A3 is obtained.

(2) Synthesis of Intermediate B33

144.2 g N-1,4-dimethylpentyl-p-phenylenediamine (0.7 mol) is dissolved in 180 g xylene, the solution is heated to 90° C., the xylene solution of the intermediate A3 obtained in step (1) is added dropwise with vigorous stirring, at the same time 112.6 g sodium hydroxide solution (25 wt %) is added dropwise for 1~2 h, and the temperature is kept for 1 h. Samples are took for GC detection, and when intermediate A3 can not be detected, the reaction is stopped and left standing. The aqueous phase is removed to obtain a xylene solution containing intermediate B33.

(3) Synthesis of Compound I-12

152.4 g N-1,4-dimethylpentyl-p-phenylenediamine (0.74 mol) is added to the xylene solution of the intermediate B33 obtained in step (2), and the mixture is heated to 180° C. for reaction. GC detection is performed, and when the content of N-1,4-dimethylpentyl-p-phenylenediamine is no longer decreased, the temperature is lowered, and the reaction is stopped. 112.6 g sodium hydroxide solution (25 wt %) is added for neutralization, the organic phase is washed with water, and xylene is distilled out to obtain a crude product. Then the crude product is recrystallized with petroleum ether and dried to obtain 295.6 g (yield 75%) 2-tert-octylamine-4,6-bis(4-(1,4-dimethylpentylamino)aniline)-1,3,5-triazine (compound I-12).

Property of compound I-12: dark purple viscous liquid.
$^1$H-NMR (400 MHz, DMSO-D6, δ ppm): 8.30 (d, 2H), 7.38 (s, 4H), 6.51 (d, 4H), 5.94 (br, 1H), 4.99 (d, 2H), 3.21-3.32 (m, 2H), 1.91 (s, 2H), 1.58-1.44 (m, 4H), 1.38 (s, 6H), 1.36-1.15 (m, 6H), 1.08-1.13 (d, 6H), 0.99 (s, 9H), 0.91 (q, 12H).

Example 13: 2-cyclohexylamine-4,6-bis(4-anilinoaniline)-1,3,5-triazine (Compound I-13)

(1) Synthesis of Intermediate A4

118.1 g cyanuric chloride (0.64 mol) is dissolved in 360 g toluene, 71.2 g sodium carbonate solid powder is added, 66.4 g toluene solution of cyclohexylamine (0.67 mol cyclohexylamine+80 g toluene) is added dropwise under vigorous stirring at 25° C. for 1.5 h, and the reaction is continued for 1.5 h after dropping. Samples are taken for GC detection, and when cyanuric chloride can not be detected, the reaction is stopped. Solid is filtered out, and a colorless and transparent solution of intermediate A4 is obtained.

(2) Synthesis of Intermediate B43

128.8 g N-phenyl-p-phenylenediamine (0.7 mol) is dissolved in 180 g toluene, the solution is heated to 100° C., the toluene solution of the intermediate A4 obtained in step (1) is added dropwise with vigorous stirring, at the same time 112.6 g sodium hydroxide solution (25 wt %) is added dropwise for 1~2 h, and the temperature is kept for 1 h. Sample are taken for GC detection, and when intermediate A4 can not be detected, the reaction is stopped and left standing. The aqueous phase is removed to obtain a toluene solution containing intermediate B43.

(3) Synthesis of Compound I-13

132.5 g N-phenyl-p-phenylenediamine (0.72 mol) is added to the toluene solution of the intermediate B43 obtained in step (2), and the mixture is heated to 140° C. for the reaction. GC detection is performed, and when the content of N-phenyl-p-phenylenediamine is no longer decreased, the temperature is lowered, and the reaction is stopped. 112.6 g sodium hydroxide solution (25 wt %) is added for neutralization, the organic phase is washed with water and then toluene is distilled out to obtain a crude product. Then the crude product is recrystallized with petroleum ether, and dried to obtain 277.5 g (yield 80%) 2-cyclohexylamine-4,6-bis(4-anilinoaniline)-1,3,5-triazine (compound I-13).

(I-12)

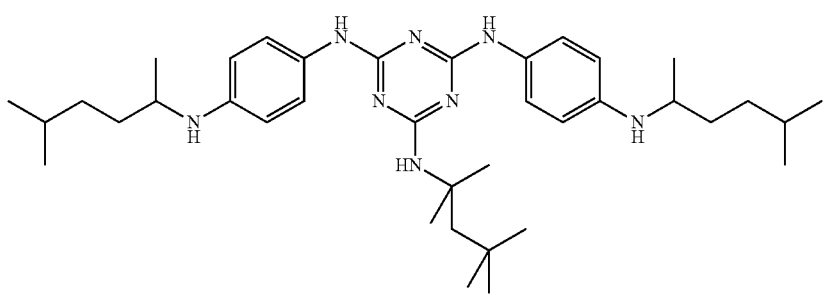

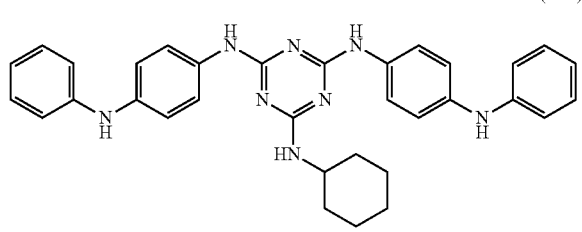

(I-13)

Property of compound I-13: dark brown solid.

$^1$H-NMR (400 MHz, DMSO-D6, δ ppm): 8.63 (s, 2H), 7.82 (s, 2H), 7.64 (br, 4H), 7.19 (t, 4H), 6.89 (q, 8H), 6.65 (t, 2H), 6.21 (s, 1H), 3.2-3.4 (m, 5H), 2.41 (br, 6H).

Testing Examples

The rubber compositions of testing examples 1-6 are prepared according to the formula shown in Table 1 by a method specifically comprising the following steps:
1. Natural rubber SCR5 and synthetic rubber BR are added to an internal mixer. After kneading for a while, carbon black N550, aromatic oil, zinc oxide, stearic acid and anti-degradants (6PPD, compound I-5, compound I-3, compound I-6, compound I-10 or compound I-12) are added, and the mixture is kept on being kneaded until the mixture is homogeneous. The temperature during kneading is controlled to between 150° C. and 160° C.;
2. The whole mixture is cooled to 100° C. or lower, then a crosslinking system (sulfur S and a promoter NS) is added, followed by kneading the whole mixture while controlling the temperature at 110° C. or lower;
3. The resulting rubber compositions are calendered into a form of sheet (2-3mm in thickness), and then vulcanized. The vulcanization temperature is 145° C. and the time is 30 minutes.

The sources of the materials in Table 1 are as follows:
SCR5: Xishuangbanna Sinochem Rubber Co., Ltd., natural rubber SCR5;
BR: Nanjing Yangzi Petrochemical Rubber Co., Ltd., synthetic rubber BR9000;
N550: Cabot Corporation, carbon black N550;
Aromatic oil: Shanghai Titan Technology Co., Ltd., general reagent;
Stearic acid: Shanghai Titan Scientific Co., Ltd., general reagent, stearic acid (AR);
Zinc oxide: Shanghai Titan Technology Co., Ltd. general reagent, zinc oxide (AR);
NS: Sennics Technology Co., Ltd., vulcanization accelerator NS;
S: Sinopharm Chemical Reagent Company, sublimed sulfur (AR);
6PPD: Sennics Technology Co., Ltd., anti-degradant SIRANTOX 6PPD;
Compound I-5: the compound synthesized in Example 5;
Compound I-3: the compound synthesized in Example 3;
Compound I-6: the compound synthesized in Example 6;
Compound I-10: the compound synthesized in Example 10;
Compound I-12: the compound synthesized in Example 12.

TABLE 1

Formulation of Rubber Compositions (unit: parts by mass)

| Recipes | Testing Example 1 | Testing Example 2 | Testing Example 3 | Testing Example 4 | Testing Example 5 | Testing Example 6 |
|---|---|---|---|---|---|---|
| SCR5 | 50.0 | 50.0 | 50.0 | 50.0 | 50.0 | 50.0 |
| BR | 50.0 | 50.0 | 50.0 | 50.0 | 50.0 | 50.0 |
| N550 | 50.0 | 50.0 | 50.0 | 50.0 | 50.0 | 50.0 |
| Aromatic oil | 5.0 | 5.0 | 5.0 | 5.0 | 5.0 | 5.0 |
| Zinc oxide | 5.0 | 5.0 | 5.0 | 5.0 | 5.0 | 5.0 |
| Stearic acid | 2.0 | 2.0 | 2.0 | 2.0 | 2.0 | 2.0 |
| 6PPD | 2.5 | | | | | |
| Compound I-5 | | 2.5 | | | | |
| Compound I-3 | | | 2.5 | | | |
| Compound I-6 | | | | 2.5 | | |
| Compound I-10 | | | | | 2.5 | |
| Compound I-12 | | | | | | 2.5 |
| NS | 0.8 | 0.8 | 0.8 | 0.8 | 0.8 | 0.8 |
| S | 1.5 | 1.5 | 1.5 | 1.5 | 1.5 | 1.5 |
| Total | 166.8 | 166.8 | 166.8 | 166.8 | 166.8 | 166.8 |

The ozone resistance and discoloration resistance of the vulcanized rubber sheets of testing examples 1 to 6 are evaluated according to the following methods, and the results are shown in Table 3.

(1) Evaluation Method of Ozone Resistance Performance

Under the conditions of temperature of 40° C., ozone concentration of 50 pphm, and elongation of 20%, the test sheets of various rubber compositions are subjected to ozone deterioration test. After 39 hours, the deterioration state of the test sheet is examined. The ozone resistance grade is based on the density of cracks formed and is judged by:

0: no cracks

1: few cracks (crack density <10 cracks per cm)

2: many cracks (10 cracks per cm <crack density <40 cracks per cm)

3: lots of cracks (crack density >40 cracks per cm)

(2) Evaluation Method of Discoloration Resistance

The vulcanized rubber sheet is packed into a ziplock bag, the rubber sheet is pressed against the bag, and the color change of the bag is observed after two weeks of exposure to outdoor. The evaluation criteria of the discoloration resistance grade are shown in Table 2.

TABLE 2

Description of Discoloration Grade

| Grade | Description |
|---|---|
| 0 | No color change |
| 1 | Slight discoloration of small area, which may be found only by careful comparison |
| 2 | Slight discoloration of large or all area, which may be easily found after comparison |
| 3 | Serious discoloration of small area, which may be directly found |
| 4 | Serious discoloration of large or all area, which may be directly found |

TABLE 3

Rubber Ozone Resistance and Discoloration Resistance Testing Results

| | Testing Example 1 | Testing Example 2 | Testing Example 3 | Testing Example 4 | Testing Example 5 | Testing Example 6 |
|---|---|---|---|---|---|---|
| anti-degradant | 6PPD | Compound I-5 | Compound I-3 | Compound I-6 | Compound I-10 | Compound I-12 |
| Ozone resistance | 2 | 1 | 2 | 2 | 2 | 2 |
| Discoloration resistance | 4 | 1 | 1 | 2 | 2 | 1 |

It may be seen from Table 1 and Table 2 that compared with the rubber composition containing a conventional anti-degradant, the rubber compositions comprising the compounds of the present invention have the same or better ozone resistance, and the discoloration of the rubber compositions comprising the compounds of the present invention is obviously suppressed.

Provided are a compound having anti-aging and discoloration resistance effects and a preparation method therefor. The compound has the structure represented by formula (I) below, wherein R, $R_1$ and $R_2$ are as defined herein. Compared with existing anti-aging agent products, the described compound has longer-lasting anti-aging performance, and has discoloration resistance. Moreover, the compound may be used as an anti-aging agent in rubber products, especially rubber tires, and can prevent the aging and deterioration of rubber products or rubber tires due to light, heat, oxygen, fatigue, and so on during use.

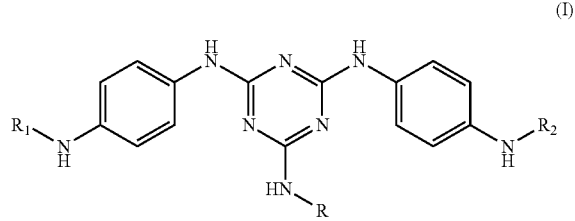

(I)

We claim:

1. A compound represented by formula (I):

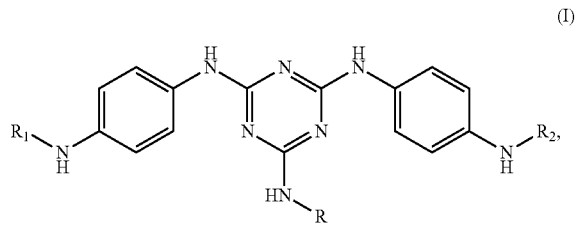

(I)

wherein R is a C3 to C16 alkyl, a C3 to C16 alkyl substituted by a C3 to C10 cycloalkyl, a C3 to C10 cycloalkyl, or a C3 to C10 cycloalkyl substituted by a C3 to C16 alkyl;

R1 and R2 are identical or different, each being independently selected from C3~C10 alkyl, C3~C10 alkyl substituted by C3~C10 cycloalkyl or C6~C14 aryl, C3~C10 cycloalkyl, C3~C10 cycloalkyl substituted by C3~C10 alkyl, C6~C14 aryl and C6~C14 aryl substituted by C3~C10 alkyl.

2. The compound of claim 1, wherein R is a C3 to C10 alkyl, a C3 to C10 cycloalkyl, a C3 to C10 branched alkyl, or a C3 to C10 cycloalkyl.

3. The compound of claim 1, wherein R is isopropyl, tert-butyl, tert-octyl, or cyclohexyl.

4. The compound of claim 1, wherein $R_1$ and $R_2$ are identical or different, each independently being a C3~C10 alkyl or phenyl.

5. The compound of claim 1, wherein $R_1$ and $R_2$ are each independently a C3 to C10 branched alkyl or phenyl.

6. The compound of claim 1, wherein $R_1$ and $R_2$ are each independently isopropyl, 1,4-dimethylpentyl, or phenyl.

7. The compound according to claim 1, wherein the compound is selected from the group consisting of:

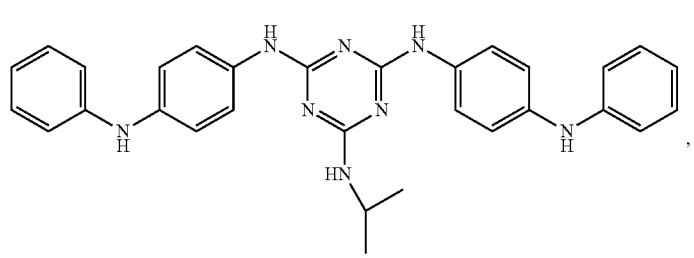

(I-1)

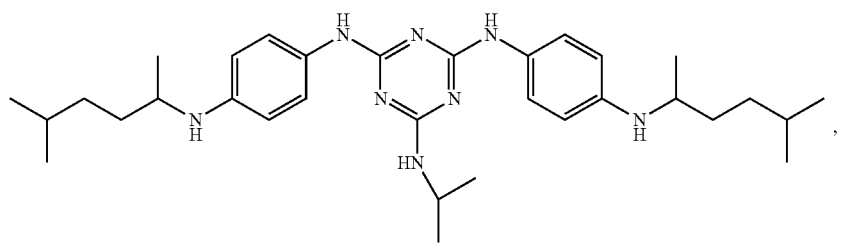
(I-2)
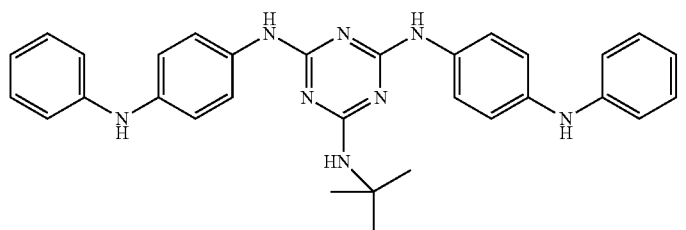
(I-3)
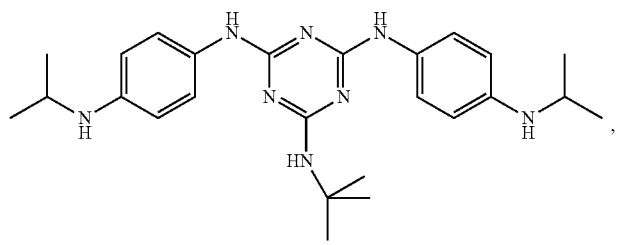
(I-4)
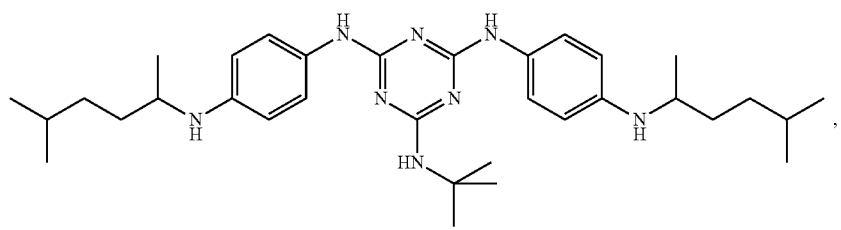
(I-5)
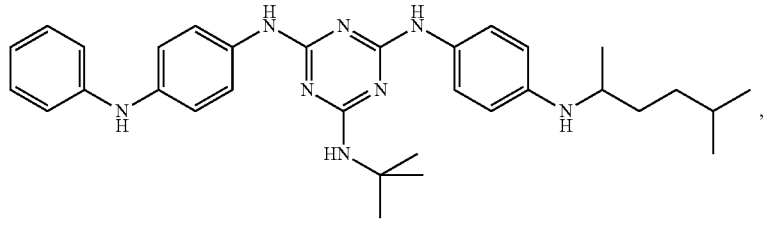
(I-6)
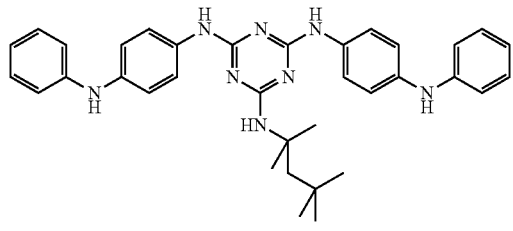
(I-7)
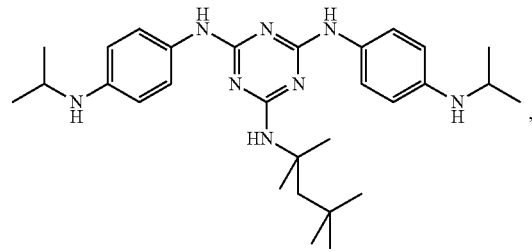
(I-8)

-continued
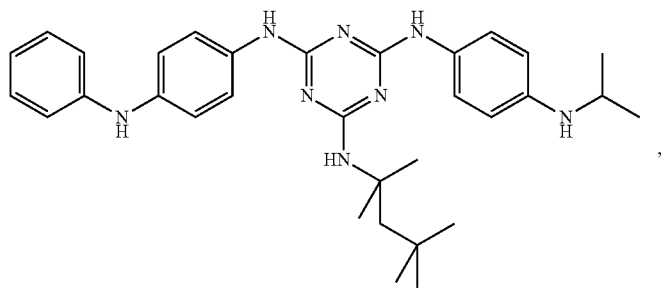
(I-9)
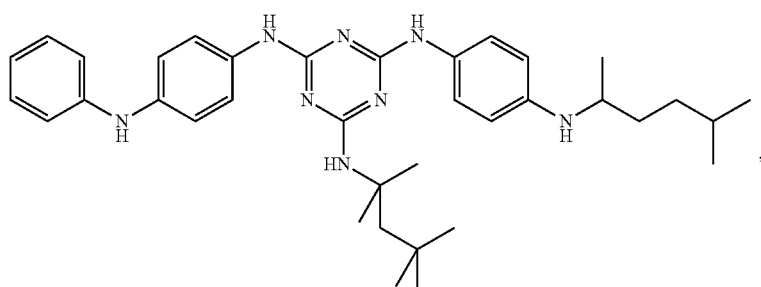
(I-10)
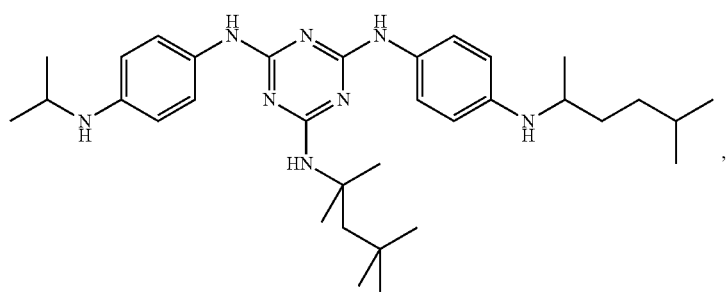
(I-11)
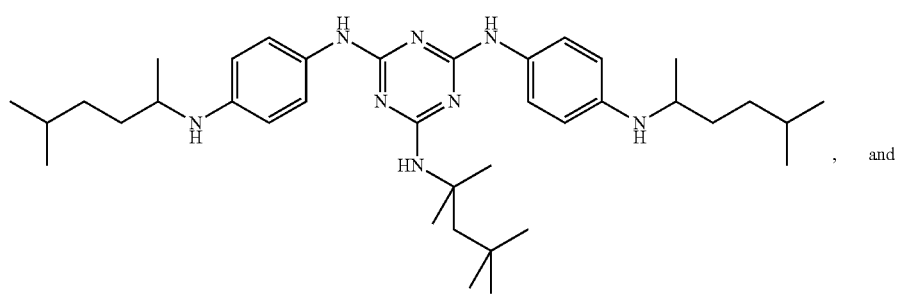
, and
(I-12)
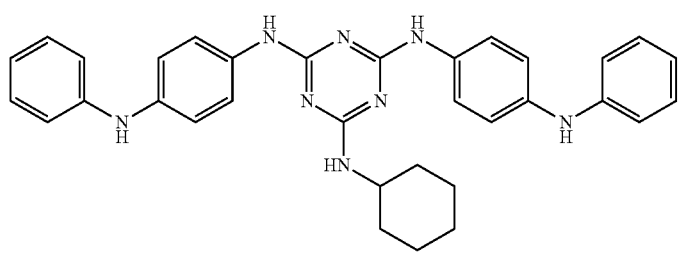
.
(I-13)

8. A method for preparing the compound as described in claim 1, comprising:

(1) reacting cyanuric chloride and $NH_2R$ to obtain an intermediate A of formula

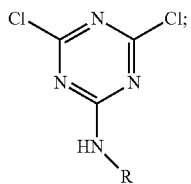

(A)

(2) reacting the intermediate A and $N-R_1$-p-phenylenediamine to obtain an intermediate B of formula

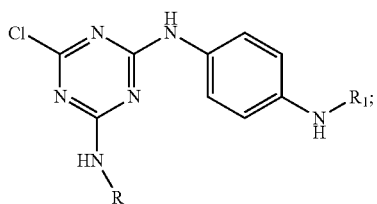

(B)

(3) reacting the intermediate B and $N-R_2$-p-phenylenediamine to obtain the compound of formula (I) of claim 1.

9. The method according to claim 8, wherein
an alkaline solid powder is added, and the reaction temperature is in a range of 0° C. to 35° C. in step (1); and/or
an alkaline liquid is added, and the reaction temperature is 50 to 100° C. in step (2).

10. The method according to claim 8, wherein the reaction temperature of step (3) is in a range of 80° C. to 180° C.

11. The method according to claim 8, wherein $R_1$ and $R_2$ are identical in the compound of formula (I), and step (2) and step (3) are combined into one step (2') wherein the intermediate A and $N-R_1$-p-phenylenediamine are reacted to prepare the compound of formula (I).

12. The method of claim 11, wherein an alkaline liquid is added, and the reaction is first carried out at 50° C. to 100° C., and then carried out at 80° C. to 180° C. in step (2').

13. A rubber composition comprising the compound of formula (I) according to claim 1.

14. The rubber composition of claim 13, wherein in the compound of formula (I) R is isopropyl, tert-butyl, tert-octyl, or cyclohexyl, and $R_1$ and $R_2$ are identical or different, each independently being a C3 to C10 alkyl or phenyl.

15. The rubber composition of claim 13, wherein the compound of formula (I) is selected from the group consisting of:

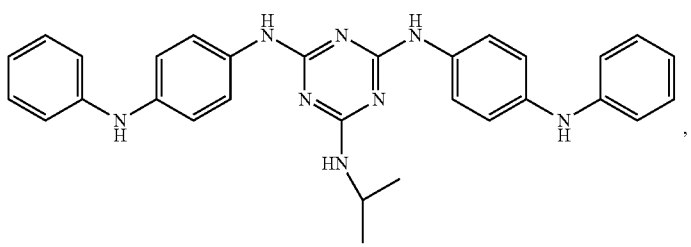

(I-1)

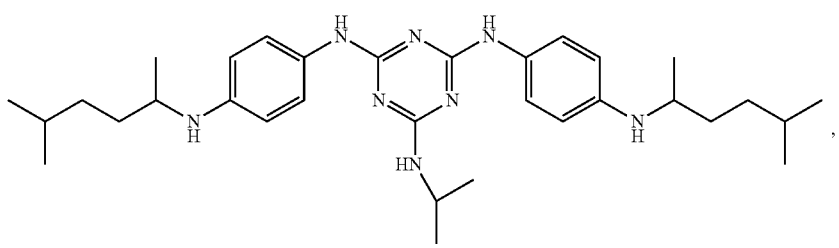

(I-2)

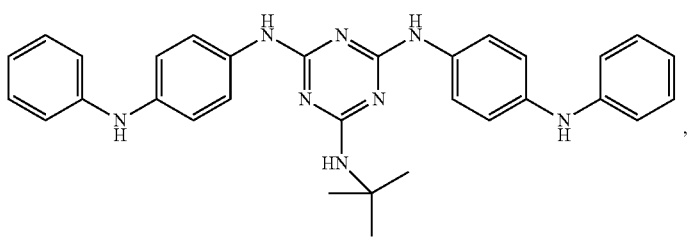

(I-3)

-continued
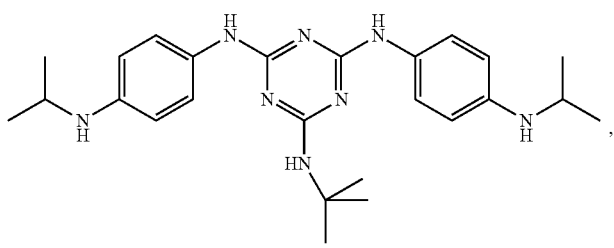
(I-4)
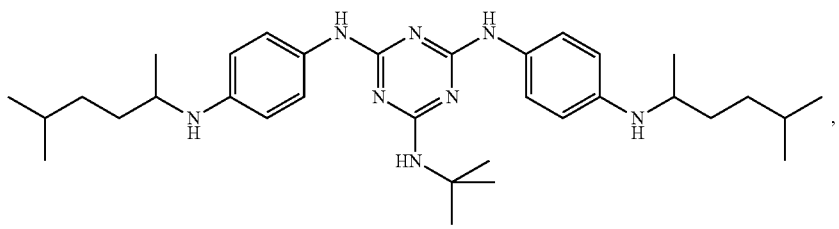
(I-5)
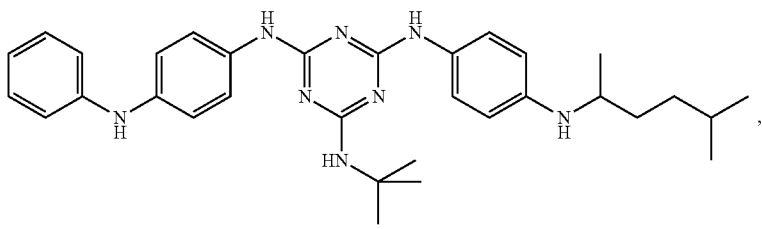
(I-6)
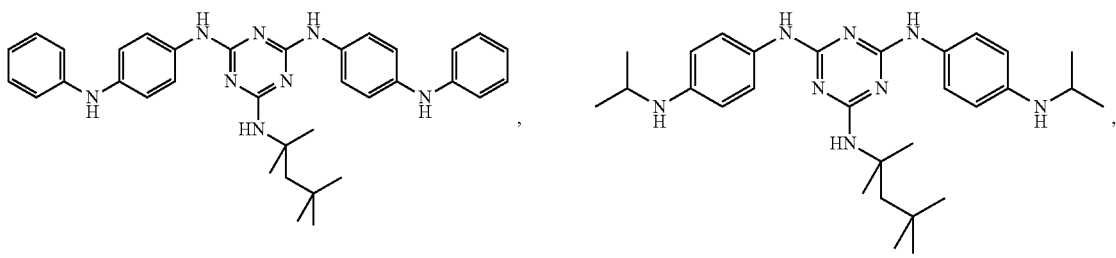
(I-7)                (I-8)
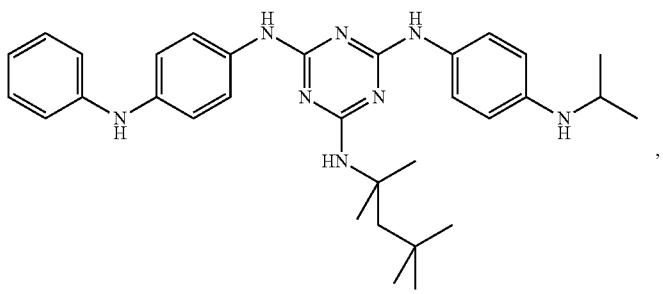
(I-9)
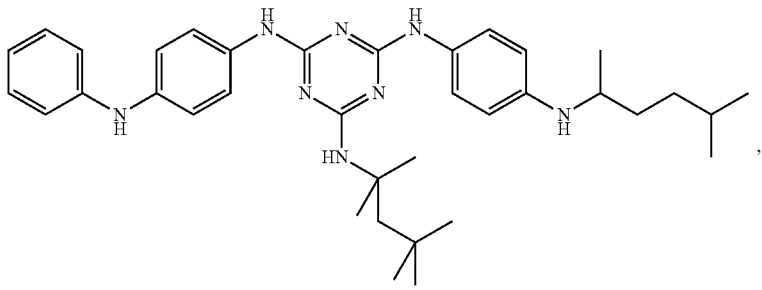
(I-10)

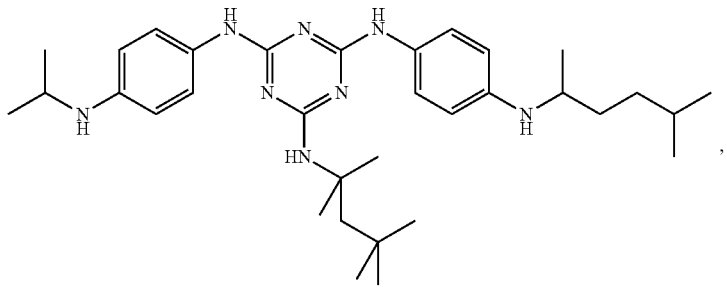
(I-11)
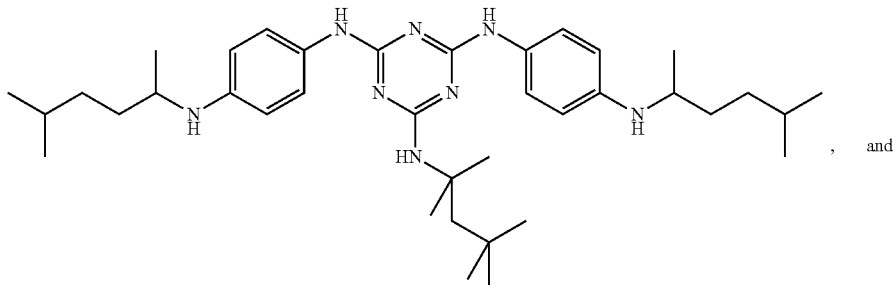
, and (I-12)
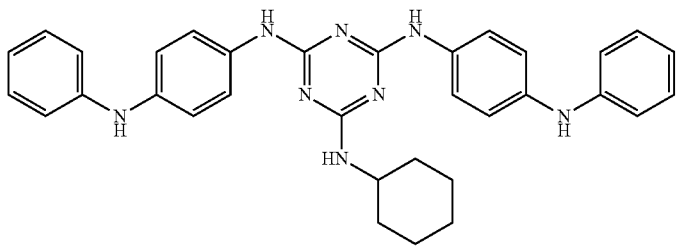
. (I-13)
16. A rubber article, comprising the rubber composition of claim 13 as a rubber component.
17. The rubber article of claim 16, wherein the rubber article is a tire.
18. The rubber article of claim 16, wherein the rubber composition comprises a compound selected from the group consisting of:
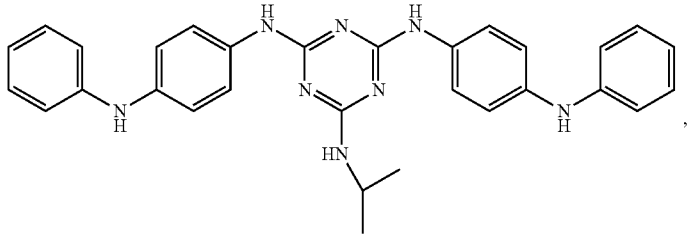
, (I-1)
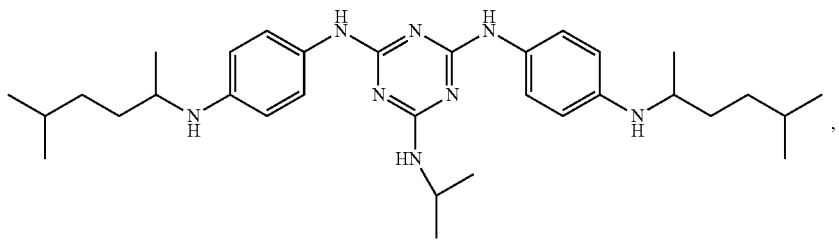
, (I-2)

-continued
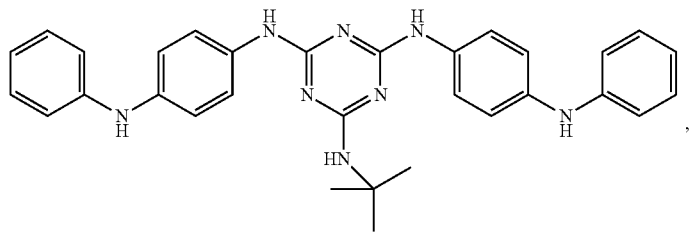
(I-3)
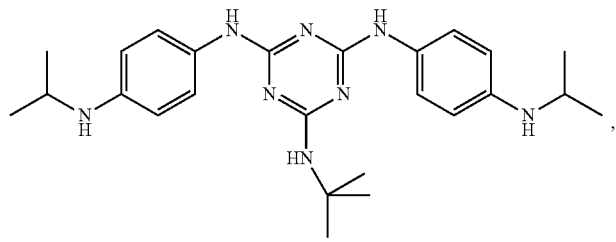
(I-4)
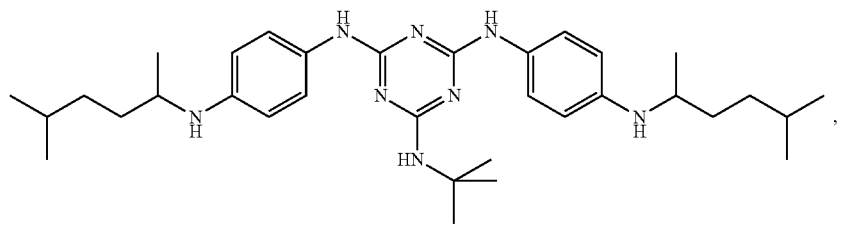
(I-5)
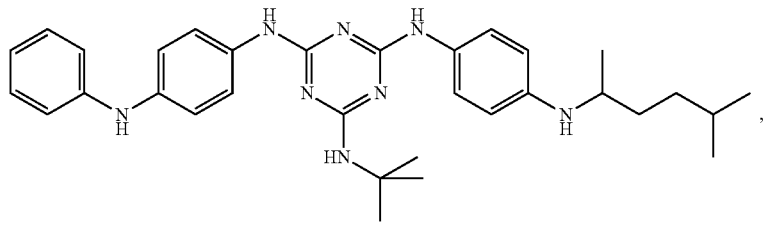
(I-6)
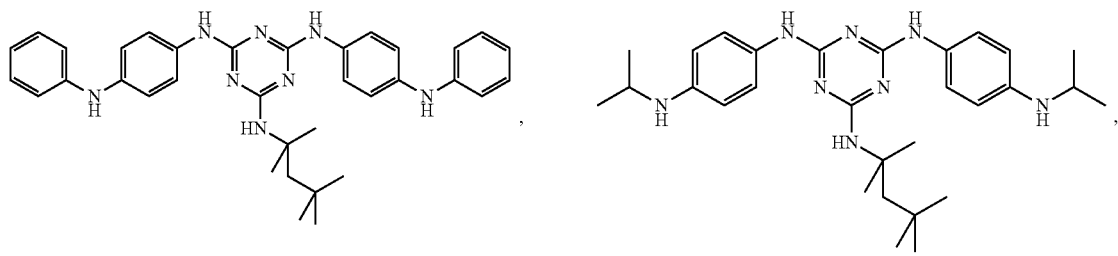
(I-7)                      (I-8)
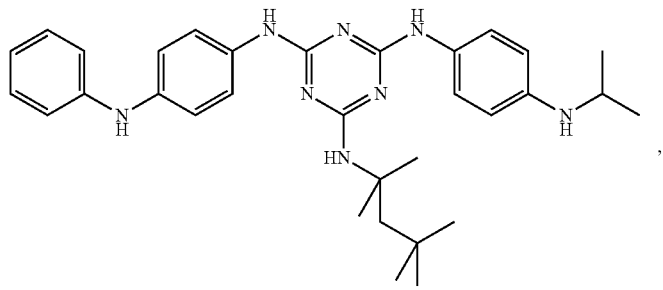
(I-9)

-continued
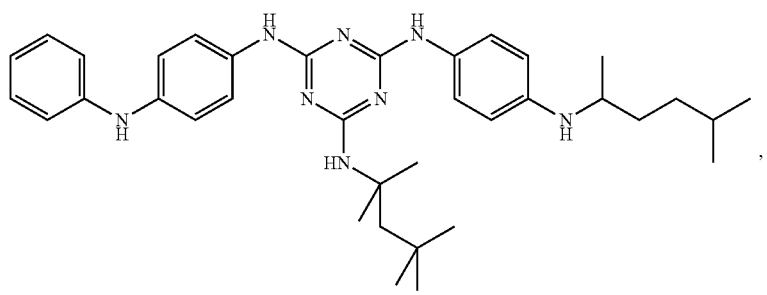
(I-10)
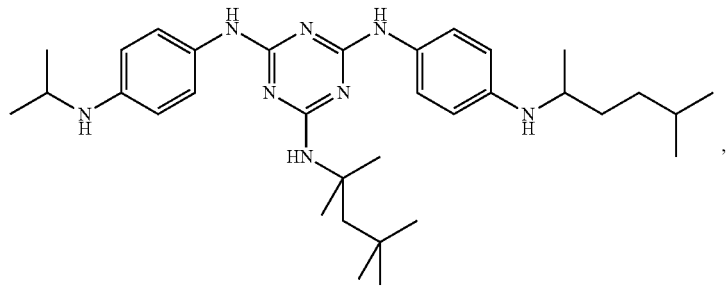
(I-11)
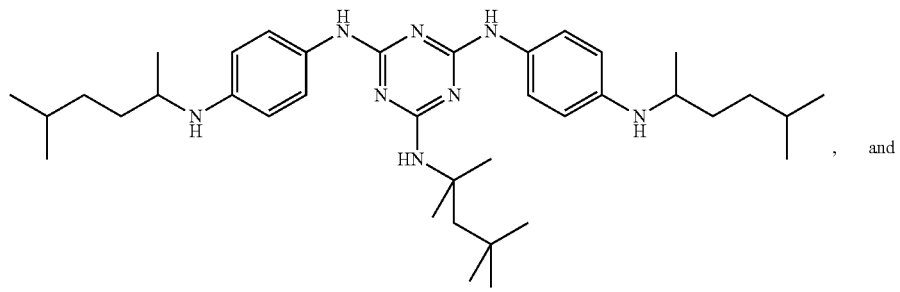
(I-12)
and
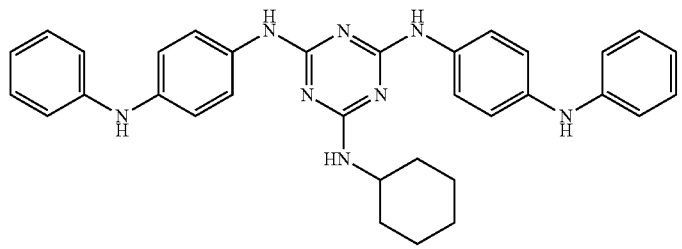
(I-13)
19. A method for improving anti-aging property, discoloration resistance property, or both, of a rubber or a rubber article, comprising applying the compound of claim 1 to a rubber or a rubber article.
20. The method of claim 19, wherein the rubber article is a tire.
21. The compound of claim 1, wherein $R_1$ and $R_2$ are different.
* * * * *